(12) United States Patent
Shipper et al.

(10) Patent No.: US 10,698,647 B2
(45) Date of Patent: Jun. 30, 2020

(54) SELECTIVE SHARING FOR COLLABORATIVE APPLICATION USAGE

(71) Applicant: Pegasystems Inc., Cambridge, MA (US)

(72) Inventors: Dan Shipper, New York, NY (US); Justin Meltzer, New York, NY (US)

(73) Assignee: Pegasystems Inc., Cambridge, MA (US)

( * ) Notice: Subject to any disclaimer, the term of this patent is extended or adjusted under 35 U.S.C. 154(b) by 77 days.

(21) Appl. No.: 15/206,956

(22) Filed: Jul. 11, 2016

(65) Prior Publication Data
US 2018/0011678 A1 Jan. 11, 2018

(51) Int. Cl.
| | | |
|---|---|---|
| *G06F 3/14* | (2006.01) | |
| *G06F 3/0481* | (2013.01) | |
| *G06F 9/451* | (2018.01) | |
| *G06F 16/954* | (2019.01) | |
| *G06F 40/14* | (2020.01) | |
| *G06F 3/0482* | (2013.01) | |
| *G06F 3/0484* | (2013.01) | |

(52) U.S. Cl.
CPC .......... *G06F 3/1454* (2013.01); *G06F 3/0482* (2013.01); *G06F 3/0484* (2013.01); *G06F 9/451* (2018.02); *G06F 16/954* (2019.01); *G06F 40/14* (2020.01); *G06F 2216/15* (2013.01)

(58) Field of Classification Search
None
See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

XPath Tutorial, Mar. 18, 2005, 7 pages (Year: 2005).*

(Continued)

*Primary Examiner* — Yongjia Pan
(74) *Attorney, Agent, or Firm* — Davis Malm & D'Agostine, P.C.; David J. Powsner

(57) ABSTRACT

The present disclosure describes systems, methods, computer-readable media, and apparatuses for selective sharing during collaborative application usage. The selective sharing system is configured for selectively sharing UI elements in a UI running on a first digital data processor. The system includes a server digital data processor configured to receive, from the first digital data processor, a collection of UI elements. The collection of UI elements may be identified based on at least one of: on one or more markup attributes corresponding to the UI elements, a content position of the UI elements, a UI definition, historical data about the UI running on the first digital data processor, and historical data about a UI running on a second digital data processor. The server digital data processor is configured to transmit, to the second digital data processor, the collection of UI elements.

20 Claims, 13 Drawing Sheets

(56) References Cited

U.S. PATENT DOCUMENTS

| | | |
|---|---|---|
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,337,407 A * | 8/1994 | Bates .................... G06Q 10/10 715/741 |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,243 A * | 10/1998 | Rich ....................... G06F 9/451 706/11 |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,909,213 A * | 6/1999 | Martin .................. G06F 3/0481 715/753 |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,983,369 A * | 11/1999 | Bakoglu ............. G06F 11/2294 714/25 |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |

(56) References Cited

U.S. PATENT DOCUMENTS

| | | |
|---|---|---|
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,310,951 B1 | 10/2001 | Wineberg et al. |
| 6,311,324 B1 | 10/2001 | Smith et al. |
| 6,313,834 B1 | 11/2001 | Lau et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,356,897 B1 | 3/2002 | Gusack |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi et al. |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |

(56) References Cited

U.S. PATENT DOCUMENTS

| | | |
|---|---|---|
| 6,807,632 B1 | 10/2004 | Carpentier et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,836,275 B1 | 12/2004 | Arquie et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,978,719 B2 | 12/2005 | Sebata et al. |
| 6,985,912 B2 | 1/2006 | Mullins et al. |
| 6,991,153 B2 * | 1/2006 | Silverbrook ......... B41J 2/17503 235/375 |
| 7,020,869 B2 | 3/2006 | Abrari et al. |
| 7,020,882 B1 * | 3/2006 | Lewallen ................ G06F 9/452 719/328 |
| 7,028,225 B2 | 4/2006 | Maso et al. |
| 7,031,901 B2 | 4/2006 | Abu El Ata |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,194,690 B2 * | 3/2007 | Guillermo ............ G06F 3/0481 709/227 |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,353,254 B2 * | 4/2008 | Kusuda ................ H04L 12/66 709/204 |
| 7,398,391 B2 | 7/2008 | Carpentier et al. |
| 7,406,475 B2 | 7/2008 | Dome et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,603,625 B2 * | 10/2009 | Guillermo ............ G06F 3/0481 715/740 |
| 7,640,222 B2 | 12/2009 | Trefler |
| 7,647,417 B1 | 1/2010 | Taneja |
| 7,665,063 B1 | 2/2010 | Hofmann et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B2 | 8/2010 | Chotin et al. |
| 7,783,596 B2 | 8/2010 | Smolen et al. |
| 7,787,609 B1 | 8/2010 | Flockhart et al. |
| 7,791,559 B2 * | 9/2010 | Piasecki ............ G06F 17/30905 345/1.1 |
| 7,818,506 B1 | 10/2010 | Shepstone et al. |
| 7,844,594 B1 | 11/2010 | Holt et al. |
| 7,870,244 B2 | 1/2011 | Chong et al. |
| 7,889,896 B2 | 2/2011 | Roehrig et al. |
| 7,937,690 B2 | 5/2011 | Casey |
| 7,971,180 B2 | 6/2011 | Kreamer et al. |
| 7,974,714 B2 | 7/2011 | Hoffberg |
| 7,983,895 B2 | 7/2011 | McEntee et al. |
| 8,001,519 B2 | 8/2011 | Conallen et al. |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 | 2/2013 | Eismann et al. |
| 8,468,492 B1 | 6/2013 | Frenkel |
| 8,479,157 B2 | 7/2013 | Trefler et al. |
| 8,516,193 B1 | 8/2013 | Clinton et al. |
| 8,739,044 B1 * | 5/2014 | Varadarajan .......... G06F 3/0481 709/204 |
| 8,744,999 B2 * | 6/2014 | Clarke .................... G06F 16/93 707/625 |
| 8,843,435 B1 | 9/2014 | Trefler et al. |
| 8,863,008 B2 * | 10/2014 | Chan .................... G06F 21/606 345/626 |
| 8,880,487 B1 | 11/2014 | Clinton et al. |
| 8,903,933 B1 * | 12/2014 | Bellini, III ........ H04L 29/08837 707/705 |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,253,129 B2 * | 2/2016 | Bassemir .............. H04L 51/046 |
| 9,270,743 B2 | 2/2016 | Frenkel |
| 9,495,340 B2 * | 11/2016 | Powell .................. G06Q 30/0241 |
| 9,678,719 B1 | 6/2017 | Frenkel |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0065912 A1 * | 5/2002 | Catchpole ............... H04L 29/06 709/224 |
| 2002/0070972 A1 | 6/2002 | Windl et al. |
| 2002/0073337 A1 | 6/2002 | Ioele et al. |
| 2002/0083063 A1 | 6/2002 | Egolf |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |

(56) References Cited

U.S. PATENT DOCUMENTS

| | | |
|---|---|---|
| 2002/0120598 A1 | 8/2002 | Shadmon et al. |
| 2002/0120627 A1 | 8/2002 | Mankoff |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2002/0186826 A1 | 12/2002 | Hsu et al. |
| 2002/0198935 A1* | 12/2002 | Crandall, Sr. ......... G06F 17/243 709/203 |
| 2003/0001894 A1 | 1/2003 | Boykin et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Scheutze et al. |
| 2003/0084401 A1 | 5/2003 | Abel et al. |
| 2003/0093279 A1 | 5/2003 | Malah et al. |
| 2003/0098991 A1 | 5/2003 | Laverty et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0003043 A1* | 1/2004 | Rajamony ......... G06F 17/30873 709/205 |
| 2004/0021686 A1* | 2/2004 | Barberis ................ G06Q 10/10 715/738 |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0049580 A1 | 3/2004 | Boyd et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |
| 2004/0145607 A1 | 7/2004 | Alderson |
| 2004/0147138 A1 | 7/2004 | Vaartstra |
| 2004/0148152 A1 | 7/2004 | Horikawa |
| 2004/0148586 A1 | 7/2004 | Gilboa |
| 2004/0162812 A1 | 8/2004 | Lane et al. |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0243587 A1 | 12/2004 | Nuyens et al. |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0027871 A1 | 2/2005 | Bradley et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0071211 A1 | 3/2005 | Flockhart et al. |
| 2005/0096959 A1 | 5/2005 | Kumar et al. |
| 2005/0104628 A1 | 5/2005 | Tanzawa et al. |
| 2005/0125683 A1 | 6/2005 | Matsuyama et al. |
| 2005/0132048 A1 | 6/2005 | Kogan et al. |
| 2005/0138162 A1 | 6/2005 | Byrnes |
| 2005/0144023 A1 | 6/2005 | Aboujaoude et al. |
| 2005/0165823 A1 | 7/2005 | Ondrusek et al. |
| 2005/0198021 A1 | 9/2005 | Wilcox et al. |
| 2005/0216235 A1 | 9/2005 | Butt et al. |
| 2005/0222889 A1 | 10/2005 | Lai et al. |
| 2005/0228875 A1 | 10/2005 | Monitzer et al. |
| 2005/0234882 A1 | 10/2005 | Bennett et al. |
| 2005/0267770 A1 | 12/2005 | Banavar et al. |
| 2005/0288920 A1 | 12/2005 | Green et al. |
| 2006/0004845 A1 | 1/2006 | Kristiansen et al. |
| 2006/0015388 A1 | 1/2006 | Flockhart et al. |
| 2006/0020783 A1 | 1/2006 | Fisher |
| 2006/0041861 A1 | 2/2006 | Trefler et al. |
| 2006/0053125 A1 | 3/2006 | Scott |
| 2006/0063138 A1 | 3/2006 | Loff et al. |
| 2006/0064486 A1 | 3/2006 | Baron et al. |
| 2006/0064667 A1 | 3/2006 | Freitas |
| 2006/0075360 A1 | 4/2006 | Bixler |
| 2006/0080082 A1 | 4/2006 | Ravindra et al. |
| 2006/0080401 A1 | 4/2006 | Gill et al. |
| 2006/0092467 A1 | 5/2006 | Dumitrescu et al. |
| 2006/0100847 A1 | 5/2006 | McEntee et al. |
| 2006/0101386 A1 | 5/2006 | Gerken et al. |
| 2006/0101393 A1 | 5/2006 | Gerken et al. |
| 2006/0106846 A1 | 5/2006 | Schulz et al. |
| 2006/0139312 A1 | 6/2006 | Sinclair et al. |
| 2006/0149751 A1 | 7/2006 | Jade et al. |
| 2006/0167655 A1 | 7/2006 | Barrow et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0209085 A1 | 9/2006 | Wong et al. |
| 2006/0218166 A1 | 9/2006 | Myers et al. |
| 2006/0271559 A1 | 11/2006 | Stavrakos et al. |
| 2006/0271920 A1 | 11/2006 | Abouelsaadat |
| 2006/0288348 A1 | 12/2006 | Kawamoto et al. |
| 2007/0005623 A1 | 1/2007 | Self et al. |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0100782 A1 | 5/2007 | Reed et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0143163 A1 | 6/2007 | Weiss et al. |
| 2007/0143851 A1 | 6/2007 | Nicodemus et al. |
| 2007/0203756 A1 | 8/2007 | Sears et al. |
| 2007/0208553 A1 | 9/2007 | Hastings et al. |
| 2007/0226031 A1 | 9/2007 | Manson et al. |
| 2007/0233902 A1 | 10/2007 | Trefler et al. |
| 2007/0239646 A1 | 10/2007 | Trefler |
| 2007/0245300 A1 | 10/2007 | Chan et al. |
| 2007/0260584 A1 | 11/2007 | Marti et al. |
| 2007/0294644 A1 | 12/2007 | Yost |
| 2008/0002823 A1 | 1/2008 | Fama et al. |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0109467 A1 | 5/2008 | Brookins et al. |
| 2008/0120593 A1 | 5/2008 | Keren et al. |
| 2008/0163253 A1 | 7/2008 | Massmann et al. |
| 2008/0184230 A1 | 7/2008 | Leech et al. |
| 2008/0189679 A1 | 8/2008 | Rodriguez et al. |

(56) References Cited

U.S. PATENT DOCUMENTS

| | | |
|---|---|---|
| 2008/0195377 A1 | 8/2008 | Kato et al. |
| 2008/0196003 A1 | 8/2008 | Gerken et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2008/0263510 A1 | 10/2008 | Nerome et al. |
| 2009/0007084 A1 | 1/2009 | Conallen et al. |
| 2009/0018998 A1 | 1/2009 | Patten, Jr. et al. |
| 2009/0075634 A1 | 3/2009 | Sinclair et al. |
| 2009/0083697 A1 | 3/2009 | Zhang et al. |
| 2009/0132232 A1 | 5/2009 | Trefler |
| 2009/0132996 A1 | 5/2009 | Eldridge et al. |
| 2009/0138844 A1 | 5/2009 | Halberstadt et al. |
| 2009/0150541 A1 | 6/2009 | Georgis |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0199123 A1 | 8/2009 | Albertson et al. |
| 2009/0228786 A1 | 9/2009 | Danton et al. |
| 2009/0271708 A1* | 10/2009 | Peters .............. G06F 17/24 715/738 |
| 2009/0276206 A1 | 11/2009 | Fitzpatrick et al. |
| 2009/0282384 A1 | 11/2009 | Keppler |
| 2009/0319948 A1 | 12/2009 | Stannard et al. |
| 2010/0011338 A1 | 1/2010 | Lewis |
| 2010/0083135 A1* | 4/2010 | Zawacki ........... H04L 12/1822 715/753 |
| 2010/0088266 A1 | 4/2010 | Trefler |
| 2010/0107137 A1 | 4/2010 | Trefler et al. |
| 2010/0217737 A1 | 8/2010 | Shama |
| 2011/0004888 A1* | 1/2011 | Srinivasan ........... G06F 9/452 719/329 |
| 2011/0066486 A1 | 3/2011 | Bassin et al. |
| 2011/0239113 A1* | 9/2011 | Hung ................. G16H 15/00 715/271 |
| 2011/0252305 A1* | 10/2011 | Tschani ......... G06F 17/30899 715/234 |
| 2011/0264251 A1 | 10/2011 | Copello et al. |
| 2012/0041921 A1 | 2/2012 | Canaday et al. |
| 2012/0102420 A1 | 4/2012 | Fukahori |
| 2012/0293558 A1 | 11/2012 | Dilts |
| 2013/0007267 A1 | 1/2013 | Khatutsky |
| 2013/0031455 A1 | 1/2013 | Griffiths et al. |
| 2013/0047165 A1 | 2/2013 | Goetz et al. |
| 2013/0159904 A1 | 6/2013 | Kelappan et al. |
| 2013/0167245 A1* | 6/2013 | Birtwhistle ........... G06Q 10/10 726/26 |
| 2013/0231970 A1 | 9/2013 | Trefler et al. |
| 2013/0254833 A1 | 9/2013 | Nicodemus et al. |
| 2013/0290249 A1 | 10/2013 | Merriman et al. |
| 2014/0019400 A1 | 1/2014 | Trefler et al. |
| 2014/0089819 A1 | 3/2014 | Andler et al. |
| 2014/0125577 A1 | 5/2014 | Hoang et al. |
| 2014/0137019 A1 | 5/2014 | Paulsen et al. |
| 2014/0277164 A1 | 9/2014 | Ramsay et al. |
| 2015/0058772 A1 | 2/2015 | Bator et al. |
| 2015/0089406 A1 | 3/2015 | Trefler et al. |
| 2015/0127736 A1 | 5/2015 | Clinton et al. |
| 2015/0149557 A1* | 5/2015 | Mendez ........... G06F 17/2247 709/205 |
| 2016/0041961 A1* | 2/2016 | Romney ............. G06F 17/241 715/230 |
| 2016/0062963 A1* | 3/2016 | Umapathy ........ G06F 17/2247 715/760 |
| 2016/0070560 A1 | 3/2016 | Chase |
| 2016/0085809 A1 | 3/2016 | de Castro Alves et al. |
| 2016/0098298 A1 | 4/2016 | Trefler et al. |
| 2016/0105370 A1 | 4/2016 | Mellor et al. |
| 2017/0013073 A1* | 1/2017 | Mendez ............. H04L 67/22 |
| 2017/0255341 A1 | 9/2017 | Trefler et al. |
| 2017/0351425 A1 | 12/2017 | D'angelo et al. |
| 2017/0357703 A1 | 12/2017 | Theimer et al. |
| 2018/0011678 A1 | 1/2018 | Shipper et al. |
| 2018/0024901 A1* | 1/2018 | Tankersley .......... G06F 11/3006 |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A1 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | 98/38564 A2 | 9/1998 |
| WO | 98/40807 A2 | 9/1998 |
| WO | 99/05632 A1 | 2/1999 |
| WO | 99/45465 A1 | 9/1999 |
| WO | 99/50784 A1 | 10/1999 |
| WO | 00/33187 A1 | 6/2000 |
| WO | 00/33217 A1 | 6/2000 |
| WO | 00/33226 A1 | 6/2000 |
| WO | 00/33235 A1 | 6/2000 |
| WO | 00/33238 A2 | 6/2000 |
| WO | 00/52553 A2 | 9/2000 |
| WO | 00/52603 A1 | 9/2000 |
| WO | 00/67194 A2 | 11/2000 |
| WO | 01/40958 A1 | 6/2001 |
| WO | 01/75610 A1 | 10/2001 |
| WO | 01/75614 A1 | 10/2001 |
| WO | 01/75747 A1 | 10/2001 |
| WO | 01/75748 A1 | 10/2001 |
| WO | 01/76206 A1 | 10/2001 |
| WO | 01/77787 A2 | 10/2001 |
| WO | 01/79994 A2 | 10/2001 |
| WO | 02/21254 A2 | 3/2002 |
| WO | WO2002019131 A8 * | 3/2002 |
| WO | 02/44947 A2 | 6/2002 |
| WO | 02/56249 A2 | 7/2002 |
| WO | 02/080006 A1 | 10/2002 |
| WO | 02/080015 A1 | 10/2002 |
| WO | 02/082300 A1 | 10/2002 |
| WO | 02/084925 A2 | 10/2002 |
| WO | 02/088869 A2 | 11/2002 |
| WO | 02/091346 A1 | 11/2002 |
| WO | 02/101517 A1 | 12/2002 |
| WO | 02/103576 A1 | 12/2002 |
| WO | 03/021393 A2 | 3/2003 |
| WO | 03/029923 A2 | 4/2003 |
| WO | 03/029955 A1 | 4/2003 |
| WO | 03/030005 A1 | 4/2003 |
| WO | 03/030013 A1 | 4/2003 |

(56) References Cited

FOREIGN PATENT DOCUMENTS

| | | |
|---|---|---|
| WO | 03/030014 A1 | 4/2003 |
| WO | 03/058504 A1 | 7/2003 |
| WO | 03/069500 A1 | 8/2003 |
| WO | 03/071380 A1 | 8/2003 |
| WO | 03/071388 A2 | 8/2003 |
| WO | 03/073319 A2 | 9/2003 |
| WO | 03/077139 A1 | 9/2003 |
| WO | 03/085503 A1 | 10/2003 |
| WO | 03/085580 A1 | 10/2003 |
| WO | 2004/001613 A1 | 12/2003 |
| WO | 2004/003684 A2 | 1/2004 |
| WO | 2004/003766 A1 | 1/2004 |
| WO | 2004/003885 A1 | 1/2004 |
| WO | 2004/046882 A2 | 6/2004 |
| WO | 2004/061815 A1 | 7/2004 |
| WO | 2004/086197 A2 | 10/2004 |
| WO | 2004/086198 A2 | 10/2004 |
| WO | 2004/095207 A2 | 11/2004 |
| WO | 2004/095208 A2 | 11/2004 |
| WO | 2004/114147 A1 | 12/2004 |
| WO | 2005/001627 A2 | 1/2005 |
| WO | 2005/003888 A2 | 1/2005 |
| WO | 2005/010645 A2 | 2/2005 |
| WO | 2005/117549 A2 | 12/2005 |
| WO | 2006/081536 A2 | 8/2006 |
| WO | 2007/033922 A2 | 3/2007 |
| WO | 2008/109441 A1 | 9/2008 |
| WO | 2009/097384 A1 | 8/2009 |

OTHER PUBLICATIONS

International Preliminary Report on Patentability for Application No. PCT/US2004/020783, dated Feb. 13, 2006 (6 pages).
International Search Report for PCT/US05/018599, dated May 15, 2007 (1 page).
International Preliminary Report on Patentability for PCT/US2005/018599, dated Jun. 5, 2007 (10 pages).
International Search Report & Written Opinion for PCT/US06/03160, dated Jul. 21, 2008 (16 pages).
International Preliminary Report on Patentability for PCT/US06/03160, dated Apr. 9, 2009 (14 pages).
International Search Report for PCT/US08/55503, dated Jul. 28, 2008 (1 page).
International Preliminary Report on Patentability for PCT/US2008/055503, dated Sep. 17, 2009 (4 pages).
International Search Report & Written Opinion for PCT/US09/32341, dated Mar. 11, 2009 (14 pages).
International Preliminary Report on Patentability for PCT/US2009/032341, dated Aug. 12, 2010 (8 pages).
Johnson et al., Sharing and resuing rules—a feature comparison of five expert system shells. IEEE Expert, IEEE Services Center, New York, NY, vol. 9, No. 3, Jun. 1, 1994, pp. 3-17.
Jones et al., A user-centered approach to functions in excel. International Conference on Functional Programming, Uppsala, Jun. 30, 2003, pp. 1-12.
Kappel, G., et al., TriGSflow active object-oriented workflow management. Proceedings of the 28th Annual Hawaii International Conference on System Sciences. 1995, pp. 727-736.
Kim, W., Object-Oriented Databases: Definition and Research Directions, IEEE Trans. on Knowledge and Data Engineering, vol. 2(3) pp. 327-341, Sep. 1990.
Kuhn, H.W., The Hungarian Method for the Assignment Problem, Naval Research Logistics Quarterly, 2 (1955), pp. 83-97.
Kuno, H.A., and E.A. Rundensteiner, Augmented Inherited Multi-Index Structure for Maintenance of Materialized Path Query Views, Proc. Sixth Int'l. Workshop on Research Issues in Data Engineering, pp. 128-137, Feb. 1996.
LaRue, J., Leveraging Integration and Workflow. Integrated Solutions, Accounting Today, SourceMedia, Aug. 2006, pp. 18-19.
Lippert, Eric, Fabulous Adventures in Coding: Metaprogramming, Toast and the Future of Development Tools, Microsoft.com Blog, MSDN Home, published Mar. 4, 2004, 6 pgs.
Mandal, et al., Integrating existing scientific workflow systems: The kepler/pegasus example. USC Information Sciences Institute, 2007, 8 pages.
Manghi, Paolo, et. al., Hybrid Applications Over XML: Integrating the Procedural and Declarative Approaches, 2002 ACM, pp. 1-6. Retrieved Mar. 22, 2007.
Manolescu, D.A., et al., Dynamic object model and adaptive workflow. Proceedings of Metadata and Active Object-Model Pattern Mining Workshop co-located with OOPSLA, 1999, vol. 99, 19 pages.
Markiewicz, M.E., et al., Object oriented framework development. ACM, 2001, 13 pages, <http://dl.acm.org/citation.cfm?id=372771>.
Markowitz, V.M., and A. Shoshani, Object Queries over Relational Databases: Language, Implementation, and Applications, IEEE Xplore, pp. 71-80, Apr. 1993.
Marmel, Elaine, Microsoft Office Project 2007 Bible, ISBN 0470009926, Wiley Publishing, Inc., 2007, 961 pages.
Maryanski, F., et al., The Data Model Compiler: A Tool for Generating Object-Oriented Database Systems, 1986 Int'l. Workshop on Object-Oriented Database Systems, IEEE, 73-84 (1986).
McConnell, Steven C., Brooks' Law Repealed, IEEE Software, pp. 6-9, Nov./Dec. 1999.
Mecca, G., et al., Cut and Paste, ACM, pp. 1-25 and Appendix I-IV (Jun. 1999). Retrieved Mar. 22, 2007.
Mitchell, T.M., Machine Learning, Chapter 3, 1997, McGraw-Hill, pp. 52-80.
Mitchell, T.M., Machine Learning, Chapter 6, 1997, McGraw-Hill, pp. 154-200.
Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.
Pientka, B., et al., Programming with proofs and explicit contexts. International Symposium on Principles and Practice of Declarative Programming, ACM, 2008, pp. 163-173, <http://delivery.acm.org/10.1145/1390000/1389469/p163-pientka.pdf?>.
Reinersten, Don, Is It Always a Bad Idea to Add Resources to a Late Project?, Oct. 30, 2000. Electronic Design. vol. 48, Issue 22, p. 70.
Riccuiti, M., Oracle 8.0 on the way with objects: upgrade will also build in multidimensional engine. InfoWorld. Sep. 25, 1995;17(39):16.
Richner, T., et al., Recovering high-level views of object-oriented applications from static and dynamic information. IEEE, 1999, 10 pages, <http://ieeexplore.ieee.org/stamp/stamp.jsp?tp=&arnumber=792487>.
Saiz, Francisco, et al. Rule-Based Web Page Generation, Proceedings of the 2nd Workshop on Adaptive Hypertext and Hypermedia, Hypertext98, Jun. 20-24, 1998, 9 pages.
Salvini, S., and M.H. Williams, Knowledge Management for Expert Systems, IEEE Colloquium on 'Knowledge Engineering', 3 pages, May 1990.
Schiefelbein, Mark, A Backbase Ajax Front-end for J2EE Applications, Internet Article, dev2dev <http://dev2dev.bea.com/1pt/a/433>, Aug. 29, 2005, 16 pages.
Schulze, W., Filling the workflow management facility into the object management architecture. Business Object Design and Implementation II. Springer London, 1998, pp. 109-117.
Sellis, T., et al., Coupling Production Systems and Database Systems: A Homogeneous Approach, IEEE Trans. on Knowledge and Data Engineering, vol. 5(2), pp. 240-256, Apr. 1993.
Shyy Y.M., and S.Y.W. Su, Refinement Preservation for Rule Selection in Active Object-Oriented Database Systems, Proc. Fourth Int'l. Workshop on Research Issues in Data Engineering, pp. 115-123, Feb. 1994.
Simpson, Alan, et al., Access 97 for Windows 95/NT; 1997 SYBEX; 16 pages; USPTO STIC-EIC 2100/2400.
Singh, G., et al., Workflow task clustering for best effort systems with pegasus, Pegasus, 2008, 8 pages.
Smedley, T.J. et al., "Expanding the Utility of Spreadsheets Through the Integration of Visual Programming and User Interface Objects," School of Computer Science, Technical University of Nova Scotia, ACM, 1996; pp. 148-155.

(56) References Cited

OTHER PUBLICATIONS

Srinivasan, V., et al., Object persistence in object-oriented applications. IBM Systems Journal, 1997, vol. 36, issue 1, pp. 66-87, <http://ieeexplore.ieee.org/stamp/stamp.jsp?tp=&arnumber-5387186>.
Stonebraker, M., The Integration of Rule Systems and Database Systems, IEEE Trans. on Knowledge and Data Engineering, vol. 4(5), pp. 415-423, Oct. 1992.
Sun, et al., "Supporting Inheritance in Relational Database Systems," IEEE, pp. 511-518, Jun. 1992.
Surjanto, B., XML content management based on object-relational database technology. Proceedings of the First International Conference on Web Information Systems Engineering, IEEE, 2000, Jun. 19-21, 2000, vol. 1, pp. 70-79.
Thuraisingham, "From Rules to Frames and Frames to Rules," AI Expert, pp. 31-39, Oct. 1989.
Vranes, S., et al., Integrating Multiple Paradigms within the Blackboard Framework, IEEE Transactions on Software Engineering, vol. 21, No. 3, Mar. 1995, pp. 244-262.
Yang, Bibo; Geunes, Joseph; O'Brien, William J.; Resource-Constrained Project Scheduling: Past Work and New Directions, Apr. 2001, 28 pages, Research Report 2001-6, Department of Industrial and Systems Engineering, University of Florida.
[No Author Listed] About the Integrated Work Manager (IWM). Pegasystems, Inc., Apr. 30, 2009, 3 pages, <http://pdn-dev/DevNet/PRPCv5/KB/TMP9ad01zurnf.asp>.
[No Author Listed] FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.
[No Author Listed] How SmartForms for Blaze Advisor works, Fair Issac White Paper, http://www.FAIRISAAC.COM/, Oct. 31, 2005, 8 pages (website no longer active).
[No Author Listed] How to Configure and Customize the Universal Worklist. SAP Netweaver '04 and SAP Enterprise Portal 6.0. SAP AG. Version 1, May 2004, 65 pages. <http://www.erpgenie.com/sap/netweaver/ep/Configuring%20the%20UWL.pdf>.
[No Author Listed] How to configure the IWM/IAC gateway. Pegasystems, Inc., Apr. 30, 2009, 4 pages, <http://pdn-dev/DevNet/PRPCv5/KB/TMP9cf8fzurq4.asp>.
[No Author Listed] How to install the Integrated Work Manager (IWM). Pegasystems, Inc., Apr. 30, 2009, 6 pages, <http://pdn-dev/DevNet/PRPCv5/KB/TMP9br1ezurp8.asp>.
[No Author Listed] HP Integrated Lights-Out 2, User Guide, Part No. 394326-004, HP, Aug. 2006, 189 pages.
[No Author Listed] Integrating with External Systems, PegaRULES Process Commander 5.2. Process Commander 5.2 reference. Pegasystems Inc, Cambridge, MA, 2006, 103 pages <http://pdn.pega.com/ProductSupport/Products/PegaRULESProcessCommander/documents/PRPC/V5/502/iwes/PRPC52_Integrating_with_External_Systems.pdf>.
[No Author Listed] IP Prior Art Database, Options when returning work items in workflow management systems. IBM, IPCOM000027980D, 2004, 3 pages.
[No Author Listed] IP Prior Art Database, Staff Queries and Assignments in Workflow Systems. IBM, IPCOM000142382D, 2006, 4 pages.
[No Author Listed] IP Prior Art Database, Using work items to manage user interactions with adaptive business services. IBM TDB, IPCOM000015953D, 2003, 4 pages.
[No Author Listed] Localizing an Application, PegaRULES Process Commander. Process Commander 4.2 reference. Pegasystems Inc., Cambdrige, MA, 2006, 92 pages <http://pdn.pega.com/DevNet/PRPCv4/TechnologyPapers/documents/Localization0402.pdf>.
[No Author Listed] Oracle Universal Work Queue: Implementation Guide. Release 11i for Windows NT. Oracle Corporation. Jul. 2001, 136 pages. <http://docs.oracle.com/cd/A85964_01/acrobat/ieu115ug.pdf>.
[No Author Listed] Solaris 9 resource manager software. A technical white paper. Sun Microsystems, Inc., Palo Alto CA, 2002, 37 pages.

XP-002291080. Retrieved Aug. 3, 2004 from <http://wwws.sun.com/software/whitepapers/solaris9/srm.pdf>.
Bertino, E., and P. Foscoli, Index Organizations for Object-Oriented Database Systems, IEEE Trans. on Knowledge and Data Engineering, 7(2):193-209 (Apr. 1995).
Bierbaum, A., et al., VR juggler: A virtual platform for virtual reality application development. Proceedings of the Virtual Reality 2001 Conference, IEEE, 2001, 8 pages, <http://ieeexplore.ieee.org/stamp/stamp.jsp?tp=&arnumber-913774>.
Breiman, L., Bagging predictors, Machine Learning, vol. 24, No. 2, Aug. 31, 1996, pp. 123-140, Kluwer Academic Publishers, Netherlands.
Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.
Burleson, D., Adding behaviors to relational databases, DBMS, 8(10): 68(5) (Sep. 1995).
Busse, Ralph et al., Declarative and Procedural Object Oriented Views, IEEE, 1998, pp. 570-578, retrieved Mar. 22, 2007.
Buyya et al., Economic Models for Resource Management and Scheduling in Grid Computing, Concurrency and Computation: Practice and Experience, 2002, vol. 14, pp. 1507-1542.
Ceri, S., et al., WIDE—A distributed architecture for workflow management. Proceedings. Seventh International Workshop on Research Issues in Data Engineering, IEEE, 1997, pp. 76-79, 1997.
Chan, T.W., and W. Hwang, Towards Integrating Logic, Object, Frame, and Production, Proc. Fourth Int'l. Conf. on Software Engineering and Knowledge Engineering, IEEE, pp. 463-469, Jun. 1992.
Cheng, Cheng-Chung; Smith, Stephen F.; A Constraint Satisfaction Approach to Makespan Scheduling, AIPS 1996 Proceedings, pp. 45-52 (1996).
Cheng, C.C. and Smith, Applying Constraint Satisfaction Techniques to Job Shop Scheduling, Annals of Operations Research, 70: 327-357 (1997).
Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.
Damerau, F.J., Problems and some solutions in customization of natural language database front ends. ACM Transactions on Office Information Systems, vol. 3, No. 2, Apr. 1, 1985, pp. 165-184.
Danforth, S., Integrating Object and Relational Technologies, Proc. Sixteenth Annual Int'l. Computer Software and Applications Conf., IEEE Comput. Soc. Press, pp. 225-226, Sep. 1992 (Abstract).
Deelman, E., et al., Pegasus: A framework for mapping complex scientific workflows onto distributed systems, submitted to Scientific Programming, Jan. 2005. Pre-journal publication article, 22 pages.
Deelman, E., et al., Pegasus: a framework for mapping complex scientific workflows onto distributed systems. Scientific Programming, 13, pp. 219-237, 2005.
Deelman, E., et al., Workflows and e-science: An overview of workflow system features and capabilities. Future Generation Computer Systems, May 2009, vol. 25, issue 5, pp. 528-540.
DeMichiel, L.G., et al., Polyglot: Extensions to Relational Databases for Sharable Types and Functions in a Multi-Language Environment, Proc. Ninth Int'l. Conf. on Data Engineering, IEEE, pp. 651-660, Apr. 1993.
Devarakonda et al., Predictability of process resource usage: A measurement-based study on UNIX. IEEE Transactions on Software Engineering. 1989;15(12):1579-1586.
Eisenstein, et al., Adaptation in Automated User-Interface Design. IUI, 2000, pp. 74-81.
Communication for European Patent Application No. 05755530.2, dated Sep. 6, 2007 (2 pages).
European Search Report for Application No. 05755530.2, dated Mar. 26, 2012 (3 Pages).
European Office Action dated Aug. 31, 2012 for Application No. 05755530.2 (4 Pages).
Communication for European Patent Application No. 07250844.3 enclosing European Search Report, dated Jul. 11, 2007 (6 pages).

(56) References Cited

OTHER PUBLICATIONS

Communication for European Patent Application No. 07250844.3, dated Mar. 28, 2008 (1 page).
European Office Action dated Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 08731127.0, dated Oct. 13, 2009 (2 pages).
Extended European Search Report dated Oct. 29, 2012 for Application No. 08731127.0 (8 Pages).
Extended European Search Report for Application No. 15189385.6, dated Dec. 17, 2015 (9 pages).
Fayad, M.E., et al., Object-oriented application frameworks. Communications of the ACM, Oct. 1997, vol. 40, issue 10, pp. 32-38, <http://dl.acm.org/citation.cfm?id=262798>.
Gajos et al. SUPPLE: Automatically Generating User Interfaces. IUI 2004, 8 pages.
Hague, Darren, Universal Worklist with SAP Netweaver Portal. Galileo Press, 2008, pp. 11-31. <http://www.sap-hefte.de/download/dateien/1461/146_leseprobe.pdf>.
International Search Report and Written Opinion for Application No. PCT/GB2004/000677, dated Aug. 2, 2004 (15 pages).
International Search Report for Application No. PCT/US2004/020783, dated Nov. 8, 2005 (2 pages).
U.S. Appl. No. 15/613,439, filed Jun. 5, 2017, Connecting Graphical Shapes Using Gestures.
Summons to Attend Oral Proceedings pursuant to rule 115(1) EPC, dated May 2, 2018 for Application No. 08731127.0 (8 pages).
U.S. Appl. No. 08/666,165, filed Jun. 19, 1996, Rules Bases and Methods of Access Thereof.
U.S. Appl. No. 10/430,693, filed May 6, 2003, Methods and Apparatus for Digital Data Processing With Mutable Inheritance.
U.S. Appl. No. 10/547,014, filed Aug. 25, 2005, Classification Using Probability Estimate Re-sampling.
U.S. Appl. No. 10/639,735, filed Aug. 12, 2003, Process/Viewer Interface.
U.S. Appl. No. 10/854,017, filed May 26, 2004, Integration of Declarative Rule-Based Processing With Procedural Programming.
U.S. Appl. No. 11/046,211, filed Jan. 28, 2005, Methods and Apparatus for Work Management and Routing.
U.S. Appl. No. 11/203,513, filed Aug. 12, 2005, Methods and Apparatus for Digital Data Processing With Mutable Inheritance.
U.S. Appl. No. 11/368,360, filed Mar. 3, 2006, Rules Base Systems and Methods With Circumstance Translation.
U.S. Appl. No. 11/396,415, filed Mar. 30, 2006, User Interface Methods and Apparatus for Rules Processing.
U.S. Appl. No. 11/681,269, filed Mar. 2, 2007, Proactive Performance Management for Multi-user Enterprise Software Systems.
U.S. Appl. No. 12/035,682, filed Feb. 22, 2008, User Interface Methods and Apparatus for Rules Processing.
U.S. Appl. No. 12/174,624, filed Jul. 16, 2008, Methods and Apparatus for Implementing Multilingual Software Applications.
U.S. Appl. No. 12/381,523, filed Mar. 12, 2009, Techniques for Dynamic Data Processing.
U.S. Appl. No. 12/386,959, filed Apr. 24, 2009, Method and Apparatus for Integrated Work Management.
U.S. Appl. No. 12/590,454, filed Nov. 6, 2009, Techniques for Content-Based Caching in a Computer System.
U.S. Appl. No. 12/619,215, filed Nov. 16, 2009, Rules Base Systems and Methods With Circumstance Translation.
U.S. Appl. No. 12/649,095, filed Dec. 29, 2009, Methods and Apparatus for Integration of Declarative Rule-Based Processing With Procedural Programming in a Digital Data-Processing Evironment.
U.S. Appl. No. 12/798,161, filed Mar. 30, 2010, System and Method for Creation and Modification of Software Applications.
U.S. Appl. No. 13/031,097, filed Feb. 18, 2011, Systems and Methods for Distributed Rules Processing.
U.S. Appl. No. 13/031,109, filed Feb. 18, 2011, Rule-Based User Interface Conformance Methods.
U.S. Appl. No. 13/341,411, filed Dec. 30, 2011, System and Method for Updating or Modifying an Application Without Manual Coding.
U.S. Appl. No. 13/536,079, filed Jun. 28, 2012, Proactive Performance Management for Multi-user Enterprise Software Systems.
U.S. Appl. No. 13/718,255, filed Dec. 18, 2012, Methods and Apparatus for Work Management and Routing.
U.S. Appl. No. 13/892,956, filed May 13, 2013, Content-Based Caching Using a Content Identifier at a Point in Time.
U.S. Appl. No. 13/897,763, filed May 20, 2013, System and Software for Creation and Modification of Software.
U.S. Appl. No. 13/907,287, filed May 31, 2013, Methods and Apparatus for Integration of Declarative Rule-Based Processing With Procedural Programming in a Digital Data-Processing Environment.
U.S. Appl. No. 14/469,208, filed Aug. 26, 2014, Techniques for Dynamic Data Processing.
U.S. Appl. No. 14/527,348, filed Oct. 29, 2014, Systems and Methods for Distributed Rules Processing.
U.S. Appl. No. 14/558,084, filed Dec. 2, 2014, Methods and Apparatus for User Interface Optimization.
U.S. Appl. No. 14/597,207, filed Jan. 14, 2015, Methods and Apparatus for Integrated Work Management.
U.S. Appl. No. 14/879,679, filed Oct. 9, 2015, Event Processing With Enhanced Throughput.
U.S. Appl. No. 14/928,085, filed Oct. 30, 2015, System and Method for Updating or Modifying an Application Without Manual Coding.

* cited by examiner

SELECTIVE SHARING FOR COLLABORATIVE APPLICATION USAGE

FIELD OF THE DISCLOSURE

The present disclosure relates to digital data processing, and more particularly, to methods, apparatus, systems, and computer-readable media for enabling users of different computers to share a user experience in an application executing on one of the computers by selectively sharing user interface elements. The teachings herein have application, by way of non-limiting example, to providing improved support for using applications.

BACKGROUND

Individuals needing assistance or support with an application have few options. They can place a call to a support phone line and speak with a technician, enter search queries into a search engine, or use electronic assistance. Collaborative screen sharing can help resolve issues by sharing a customer's screen with a remote customer service representative. Similarly, collaborative browsing, or co-browsing, can allow a customer and a customer service representative to navigate a web site collaboratively. However, these screen sharing systems can require large amounts of computing resources. For example, large amounts of information associated with the shared screen are often exchanged over the network, straining network communication resources. These screen sharing systems can also burden customers' individual computers during the screen sharing session while screen or web browser contents are transmitted to the customer service representative, adversely affecting performance of the customer's computer. In addition to requiring computing resources, screen share or co-browse systems can require high levels of attention from customer service representatives. That is, with screen share or co-browse systems, customer service representatives are focused on an individual customer, and thereby limited in the number of customers they can assist at a time.

Additionally, collaborative screen share and co-browsing environments can raise privacy concerns. Basic screen share applications allow the customer service representative to view everything on the customer's screen. Other screen share applications allow the customer to specify an individual application such as a web browser to share while keeping private the customer's other applications. However, even when the screen share applications focus on an individual application, the customer may not want to share certain information such as a social security number or credit card number. Still more advanced co-browse environments may allow customers or administrators to mask individual fields. However, the customer must remember that the masking feature exists and use the feature, or the administrator must configure the application or the co-browse session to perform the masking.

An object of this invention is to provide improved systems, apparatus, methods, and computer-readable media for digital data processing. A more particular object is to provide improved systems, apparatus, methods, and computer-readable media for selectively sharing UI elements for collaborative application usage.

SUMMARY

The foregoing are among the objects attained by the invention which provides, in one aspect, a digital data processing system, apparatus, method, and computer-readable medium for selectively sharing UI elements between a first and second digital data processor for collaborative application usage. A further object is to provide such improved systems, apparatus, methods, and computer-readable media as to suggest UI elements for selective sharing. The systems, apparatus, methods, and computer-readable media further provide for remote highlighting of UI elements selected in an application executing on the second digital data processor.

In one aspect, the present disclosure includes a system for selectively sharing elements in a UI running on a first digital data processor. The system includes a server digital data processor. The server digital data processor is configured to receive, from the first digital data processor, a collection of UI elements associated with the UI. The collection of UI elements is identified by the first digital data processor based on at least one of: one or more markup attributes corresponding to the UI elements, a content position of the UI elements, a UI definition, or historical data about the UI running on the first or a second digital data processor. The server digital data processor is further configured to transmit, to the second digital data processor, the collection of UI elements for selection on the second digital data processor.

In another aspect, the present disclosure includes a system for selectively sharing UI elements in a UI running on a first digital data processor. The system includes a server digital data processor. The server digital data processor is configured to receive, from the first digital data processor, a collection of elements associated with the UI. The server digital data processor is further configured to identify a subset of the collection of UI elements. The subset of UI elements is identified by the server digital data processor based on at least one of: one or more markup attributes corresponding to the UI elements, a content position of the UI elements, a UI definition, or historical data about the UI running on the first or a second digital data processor. The server digital data processor is configured to transmit, to the second digital data processor, the subset of UI elements for selection on the second digital data processor.

In other aspects, the present disclosure includes a method for selectively sharing UI elements in a UI running on a first digital data processor. The method includes receiving, from the first digital data processor, a collection of UI elements associated with the UI. The method further includes identifying a subset of the collection of user interface elements. The subset of user interface elements is identified by a server digital data processor based on at least one of: one or more markup attributes corresponding to the user interface elements, a content position of the user interface elements, a user interface definition, or historical data about the user interface running on the first or a second digital data processor. The method additionally includes transmitting, to the second digital data processor, the subset of user interface elements for selection on the second digital data processor.

Related aspects of the present disclosure facilitate remote highlighting of the selectively shared UI elements. The server digital data processor is configured to receive, from the second digital data processor, one or more UI elements selected among the collection of UI elements. The server digital data processor is further configured to transmit, to the first digital data processor, an event containing the selected one or more UI elements. A UI definition for the UI running on the first digital data processor is updated to visibly identify at least one of the selected UI elements on the UI based on a size and a position of the at least one of the selected UI elements in the UI definition.

In a further aspect, the present disclosure includes updating the UI definition to include at least one new element to visibly identify the at least one of the selected UI elements by identifying a bounding box size of the selected one or more UI elements, determining a corresponding bounding box size and a corresponding position for one or more regions of visible identification based on the size and the position of the selected one or more UI elements, creating the one or more regions of visible identification using the corresponding bounding box size and the corresponding position, and inserting the one or more regions of visible identification into the UI definition.

Other aspects of the present disclosure provide systems, apparatus, methods, and computer-readable media for suggesting UI elements for selection on the second digital data processor. The UI elements suggested for selection may be determined by identifying related UI elements based on initial validation data, and filtering the related UI elements to retain UI elements identified based on at least one of: the one or more markup attributes corresponding to the user interface elements, the content position of the user interface elements, the user interface definition, or the historical data about the user interface running on the first or second digital data processor.

In a related aspect, the identifying the related user interface elements based on the initial validation data includes identifying one or more unique phrases by performing text mining on the subset of user interface elements, and searching the subset of user interface elements for one or more user interface elements containing the one or more unique phrases.

In other aspects, the markup attributes corresponding to the UI elements may include at least one of <b>, <strong>, <i>, <em>, <u>, <ins>, <mark>, <del>, <font>, color, align, text-align, or text-decoration.

In another aspect, the UI definition includes at least one of a document object model (DOM) tree, hypertext markup language (HTML), or extensible markup language (XML).

In a related aspect, the UI definition includes a tree structure of the DOM tree.

The foregoing and other aspects of the invention are evident in the description that follows and in the drawings.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the detailed description that follows.

DETAILED DESCRIPTION OF EXAMPLE EMBODIMENTS

Figure 1A:
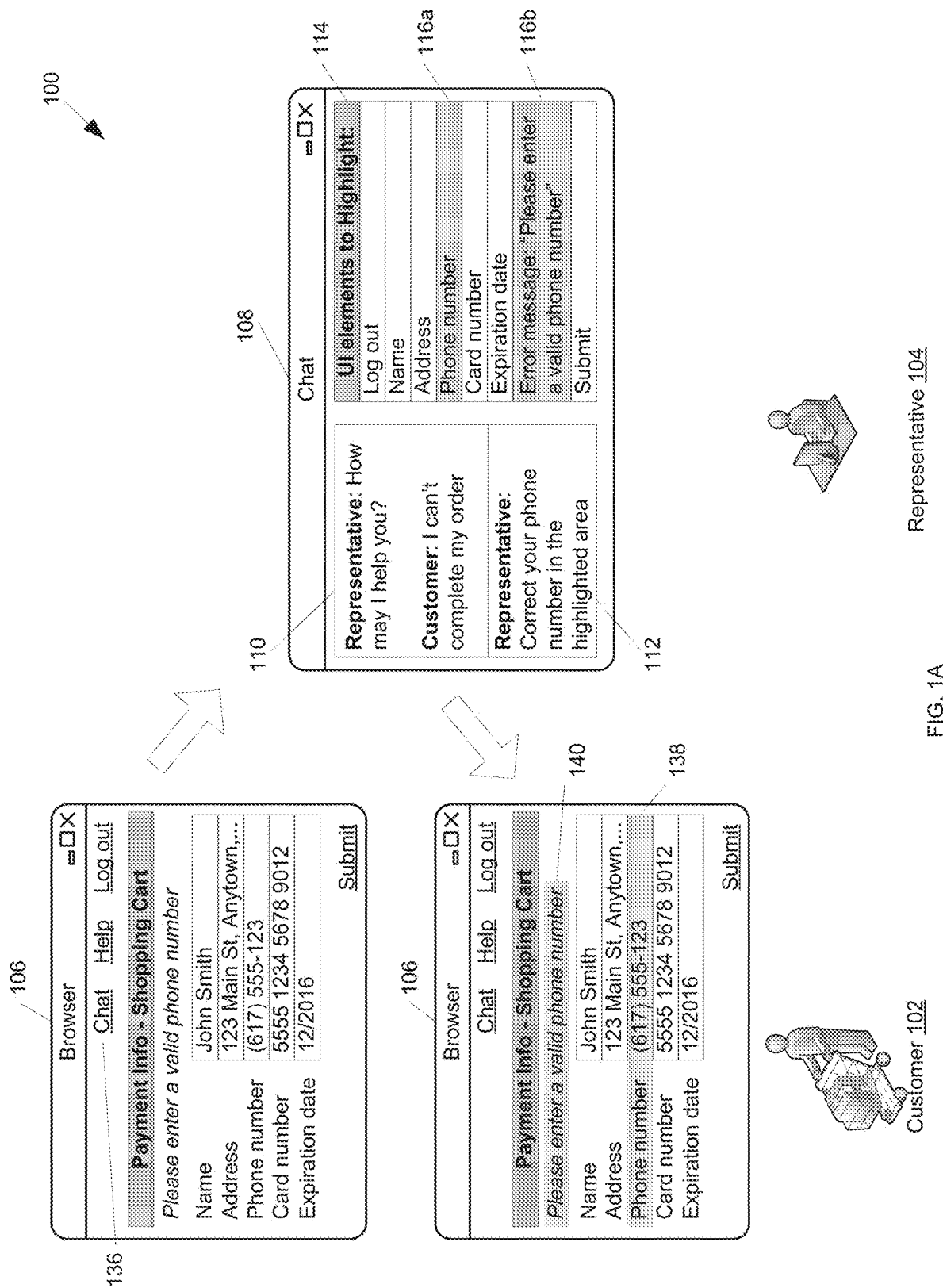
FIG. 1A illustrates an example selective sharing usage scenario in accordance with some embodiments of the present invention.

The systems, apparatus, methods, and computer-readable media described herein allow for selective sharing of user interface (UI) elements to facilitate collaborative application usage. The selective sharing system described herein can be used in any application that supports collaborative usage.

In a non-limiting example usage scenario, a customer can be using a web browser application and attempting to complete a purchase using an online shopping cart. The customer is unable to complete his purchase and selects a "chat" link for assistance. A customer service representative working remote from the customer receives a request for collaboration. Selected UI elements shown in the customer's application are shared with an application executing on the customer service representative's computer, for example appearing in a collection in the representative's application. The UI elements can be selected for sharing from all UI elements based on UI characteristics, a UI definition, or historical data for a customer or a customer service representative. The application executing on the customer service representative's computer is sometimes referred to herein as a "collaboration application." One non-limiting example collaboration application on the customer service representative's computer can be a chat window for help.

Included in the collection can be an error message currently displayed in the customer's application, such as "Please enter a valid phone number." In some embodiments, upon seeing this error message in the collection the customer service representative can select the error message along with a phone number field in the collaboration application. Accordingly, the customer service representative's selections can cause the customer's application to highlight remotely or otherwise visibly identify the error message and phone number field directly in the customer's user interface.

The selective sharing system is configured for selectively sharing UI elements of an application running on a first digital data processor. The system includes a server digital data processor configured to receive, from the first digital data processor, a collection of elements associated with the UI. In some embodiments, the collection of UI elements represents a subset of all available elements in the UI running on the first digital data processor. The subset of UI elements can be selected for sharing from all UI elements based on UI characteristics, a UI definition, or historical data for a customer or a customer service representative. The server digital data processor, or first or second digital data processor can identify the collection of UI elements. In further embodiments, the server digital data processor, or first or second digital data processor are configured to suggest UI elements for a customer service representative to select. The selective sharing system can suggest the UI elements based on initial validation data. The server digital data processor is configured to transmit, to a second digital data processor, the collection of UI elements for selection on the second digital data processor.

In some embodiments, the server digital data processor is further configured to receive, from the second digital data processor, one or more UI elements selected among the collection of UI elements. The server digital data processor is still further configured to transmit, to the first digital data processor, an event containing the selected one or more UI elements. A UI definition for the UI running on the first digital data processor is updated to visibly identify at least one of the selected UI elements on the UI based on a size and a position of the at least one of the selected UI elements in the UI definition.

FIG. 1A illustrates an example selective sharing usage scenario 100 in accordance with some embodiments of the present invention. Usage scenario 100 includes customer 102 in communication with representative 104.

Customer 102 uses application 106. In some embodiments, customer application 106 can be a web browser configured to render and display a user interface. In this regard, customer application 106 can be implemented, for example, on one or more digital data processing systems in the conventional manner known in the art, as adapted in accord with the teachings herein. Customer application 106 can display an online shopping cart for completing a purchase. Customer 102 has entered his information into customer application 106 and selected the Submit link, but the online shopping cart fails to advance. Customer 102 selects Chat link 136 to request assistance.

Representative 104 receives the request for collaboration from customer 102 via collaboration application 108. In some embodiments, collaboration application 108 can be a chat application. The chat application is configured to display message section 110, and UI elements section 114. Message section 110 lists a transcript of messages exchanged between representative 104 and customer 102. For example, upon receiving the request for collaboration, representative 104 sends a message to customer 102 asking "How may I help you?" Customer 102 replies "I can't complete my order."

UI elements section 114 displays a collection of UI elements identified from customer application 106. However, modern user interfaces have hundreds or thousands of elements on one screen or page that could potentially be listed in UI elements section 114. Accordingly, one problem is that the collection may become unwieldy if the selective sharing system displays all elements from the UI for customer application 106. One solution is for some embodiments of the selective sharing system to identify a subset of UI elements for selective sharing and display in UI elements section 114. For example, the selective sharing system can identify the subset of UI elements to include in UI elements section 114 based on characteristics of the UI or historical data for the customer or representative. The UI characteristics can include markup attributes, content position, UI definition structure, or any combination of the above.

In some embodiments, representative 104 selects one or more UI elements 116a-b in the user interface of collaboration application 108. The selection causes the selective sharing system to highlight or otherwise visibly identify corresponding UI elements 138, 140 in customer application 106. Customer 102 sees that error message 140 is now highlighted, and customer 102 is able to correct the error in phone number field 138 (one missing digit) and proceed to complete the online order.

In some embodiments, the selective sharing system uses initial validation data received from customer application 106, along with UI characteristics or historical data to suggest UI elements for representative 104 to select. For example, before receiving any selection in collaboration application 108, the selective sharing system may first suggest that representative 104 should select error message element 116b, based on initial validation data and UI characteristics in customer application 106. Non-limiting example initial validation data can be that the Phone number field has too few digits. Non-limiting example UI characteristics can include markup attributes and content position of the error message. For example, the error message may be toward the top of the web page in red text. Remote application 108 may display suggested UI elements in a different color, font, or other visible identification from UI elements actually selected by representative 104. After representative 104 selects error message element 116b, the selective sharing system may further suggest that representative 104 should select phone number field element 116a, based on parsing the content of error message 116b and performing text analytics or text mining on the result to identify unique words or phrases in error message 116b.

Advantageously, the selective sharing system improves response time for customer service representatives. Traditional screen share or co-browse systems can require high levels of attention from customer service representatives. That is, with traditional screen share or co-browse systems, customer service representatives are focused on assisting an individual customer, and limited in the number of customers they can assist at a given time. In contrast, the selective sharing system allows representative 104 to have multiple collaboration applications 108 open at a time assisting multiple customers at a time using selective sharing. Because the selective sharing system selects, shares, and suggests a selected subset of elements in UI elements section 114 compared to a full screen share or co-browse session, collaboration application 104 does not require as high levels of attention to select remote UI elements for highlighting and provide service to an individual customer. Collaboration application 104 also uses fewer computing resources such as lower central processing unit (CPU) usage and less memory. This responsiveness can improve customer service performance metrics such as lowering average handle time.

Additionally, the selective sharing system can address privacy issues. Some embodiments of the selective sharing system transmit only field labels to the representative, without transmitting values entered in those fields. For example, the selective sharing system may transmit the field labels Name, Address, Phone number, Card number, and Expiration date from customer application 106 for display in UI elements section 114. However, the values of the credit card number and expiration date of customer 102 are not transmitted, thereby protecting the privacy of customer 102. Traditional co-browse systems may mask field values to provide privacy. However, masking can add complexity in implementation and use. Customer 102 must remember the masking feature exists and use the feature, or the administrator must configure the application or co-browse session to perform the masking. In contrast, these embodiments allow a customer service representative to provide assistance of a similar quality to screen sharing or co-browsing, without privacy risks, complexity, or resource intensive performance found in traditional screen share or co-browse architectures.

Figure 1B:
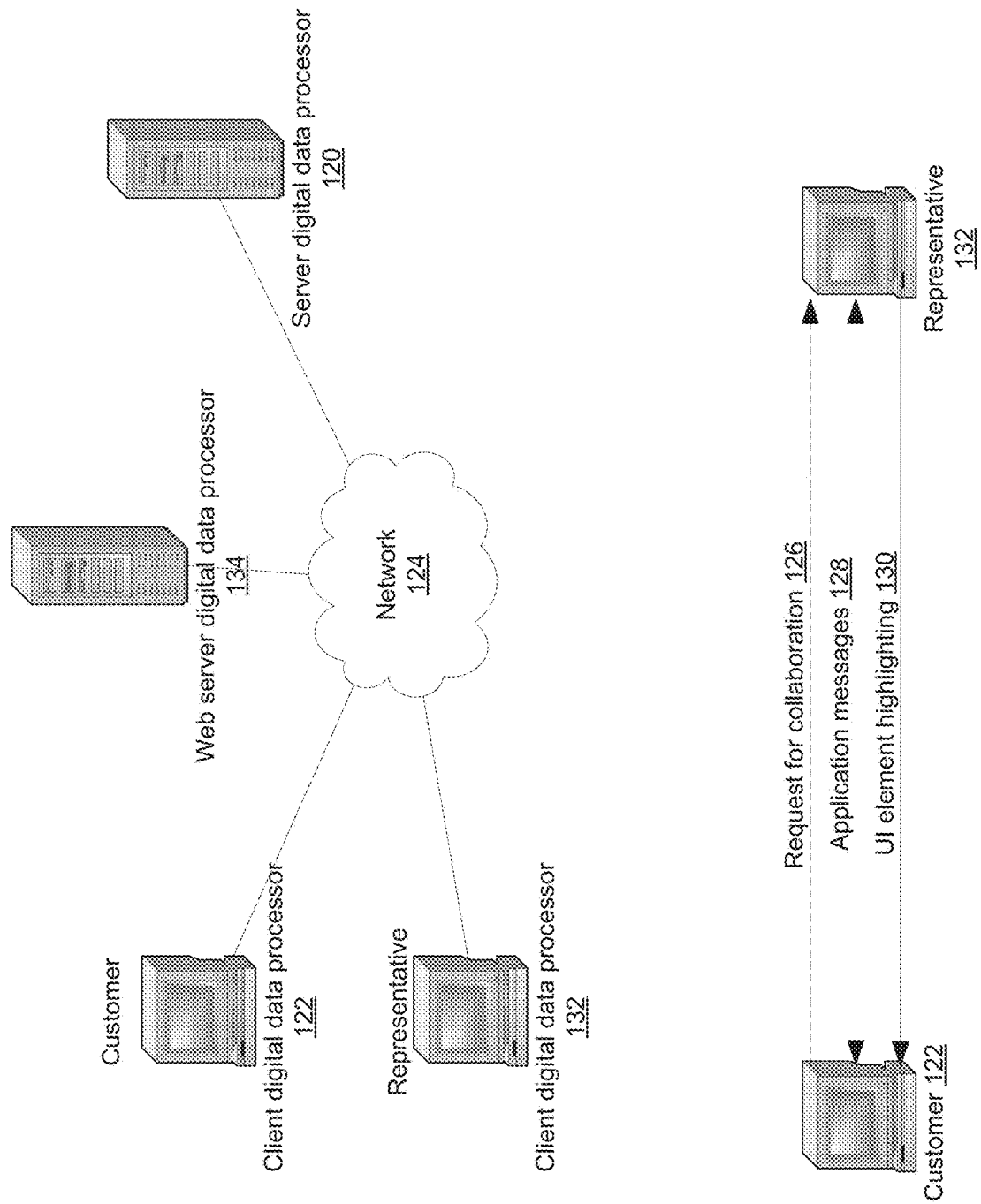
FIG. 1B illustrates an example selective sharing system in accordance with some embodiments of the present invention.

FIG. 1B illustrates an example selective sharing system 142 in accordance with some embodiments of the present invention. Customer client 122 and representative client 132 are in communication with server 120 using network 124. In some embodiments of selective sharing system 142, web server 134 is also in communication with server 120, customer client 122, or representative client 132 using network 124.

Customer client 122 initiates a selective sharing session by sending request 126 for collaboration to representative client 132. Upon receiving request 126 for collaboration, representative client 132 and customer client 122 exchange application messages 128. Non-limiting example application messages 128 may include chat messages transmitted and received to an application running on representative client 132. In some embodiments, customer client 122 may receive UI element highlighting events 130 from representative client 132. UI element highlighting events 130 may represent selections made by a customer service representative or other assistant where the collaboration application displays a broader collection of UI elements. The customer service representative selects a subset or all elements in the application running on representative client 132.

Some embodiments of customer client 122 and representative client 132 include one or more client digital data processors. The client digital data processors can be of the type commercially available in the marketplace suitable for operation in selective sharing system 142 and adapted in accord with the teachings herein, for example, in communication with applications executing on one or more server 120. Customer client 122 and representative client 132 may be implemented in desktop computers, laptop computers, workstations, mobile computers executing on mobile phones, tablet computers, personal digital assistants (PDAs), or other suitable apparatus adapted based on the systems and methods described herein. The client digital data processors include central processing, memory, storage using a non-transitory computer-readable medium (e.g., a magnetic disk, solid state drive, or other storage medium), and input/output units and other constituent components (not shown) of the type conventional in the art that are programmed or otherwise configured in accord with the teachings herein.

In some embodiments, server 120 or web server 134 include one or more server digital data processors. The server digital data processors can be digital processors of the type commercially available in the marketplace suitable for operation in selective sharing system 142 and adapted in accord with the teachings herein. Some embodiments of selective sharing system 142 may include web server 134 in communication with server 120. For example, server 120 or web server 134 can execute web applications or enterprise applications that directly or indirectly generate UI definitions for display on customer client 122 or representative client 132. In some embodiments, the UI definition can include hypertext markup language (HTML), a document object model (DOM) tree for a web page of the enterprise application or web application, or extensible markup language (XML) representing the enterprise application or web application. Web server 134 may provide or transfer web page assets such as content, text, images, or style sheets in coordination with server 120. In other embodiments of selective sharing system 142, web server 134 may be omitted or optional. Some embodiments of server 120 can utilize rules forming enterprise applications that execute in one or more rules engines, e.g. as discussed elsewhere herein. Though server 120 or web server 134 can be typically implemented in server-class computers such as a minicomputer, server 120 or web server 134 may also be implemented in desktop computers, workstations, laptop computers, tablet computers, personal digital assistants (PDAs), mobile computers, or other suitable apparatus adapted based on the systems and methods described herein. The server digital data processor includes central processing, memory, storage using a non-transitory computer-readable medium (e.g., a magnetic disk, solid state drive, or other storage medium), and input/output units and other constituent components (not shown) of the type conventional in the art that are programmed or otherwise configured in accord with the teachings herein.

In some embodiments, an enterprise can deploy selective sharing system 142 in support of enterprise applications executing on server 120 remote to customer client 122 or representative client 132. Such enterprise applications can include specialized software or hardware used within a specific industry or business function (e.g., human resources, finance, healthcare, telecommunications, insurance, etc.). Alternatively, the enterprise applications can include cross-industry applications (e.g., project management), or other types of software or hardware applications.

In some embodiments, rules define the enterprise applications. Server 120 can be in communication with a rules engine (not shown). The rules engine can be in communication with a rules base and a transactional database (not shown). As the enterprise application executes on a server digital data processor (e.g., server 120), selective sharing system 142 may retrieve any portion of the rules that define the enterprise application from the rules base and process or execute the rules in response to requests or events signaled to or detected by the server digital data processors or customer or representative digital data processors at runtime (e.g., using the rules engine).

The rules base can include a rules base of the type known in the art (albeit configured in accord with the teachings herein) for storing rules (e.g., scripts, logic, controls, instructions, metadata, etc.) and other application-related information in tables, database records, database objects, and so forth. Preferred rules and rules bases can be of the type described in U.S. Pat. No. 5,826,250, entitled "Rules Bases and Methods of Access Therein" and U.S. Pat. No. 7,640,222, entitled "Rules Base Systems and Methods with Circumstance Translation," the entire contents of both of which are incorporated by reference herein in their entirety. In other embodiments, rules and rules bases that are architected or operated differently may be used as well.

Some embodiments of selective sharing system 142 may utilize multiple rules bases. For example, the rules base may be an enterprise-wide rules base in communication with the rules engine, and domain-specific rules bases may be accessible to server 120, customer client 122, or representative client 132 via network 124. If multiple rules bases are provided in a given embodiment, the rules bases may be of like architecture and operation or may differ in architecture and operation as well.

In some embodiments, rules may comprise meta-information structures. For example, the rules can include data elements or method elements. The method elements can be procedural or declarative. For example, method elements in a rule may be procedural insofar as the rule comprises one or more of a series of ordered steps. Declarative elements in a rule may set forth (i.e., declare) a relation between variables or values (e.g., a loan rate calculation or a decision-making criterion). Alternatively, declarative elements may declare a desired computation or result without specifying how the computations should be performed or how the result should be achieved. In one non-limiting example, a declarative portion of a rule may declare a desired result of retrieving a specified value without specifying a data source for the value or a particular query language for such retrieval (e.g., SQL, CQL, .QL, etc.). In other cases, the declarative portion of a meta-information structure may comprise declarative programming language statements (e.g., SQL). Still other types of declarative meta-information structures are possible.

While some rules may comprise meta-information structures that are wholly procedural and other rules may comprise meta-information structures that are wholly declarative, selective sharing system 142 can also include rules that comprise both procedural and declarative meta-information structures. That is, such rules can have meta-information structure portions that are declarative, as well as meta-information structure portions that are procedural. Furthermore, rules of the illustrated embodiments that comprise meta-information structures may also reference or incorporate other rules. Those other rules may themselves in turn reference or incorporate still other rules. As a result, editing such a rule may affect one or more rules that incorporate it (if any).

An advantage of rules that comprise meta-information structures over conventional rules is that meta-information structures provide administrators with flexibility to apply code-based or model-driven techniques in development and modification of applications or computing platforms. Particularly, like models in a model-driven environment, meta-information structures comprise data elements that can be used to define aspects of a complex system at a higher level of abstraction than source code written in programming languages such as Java or C++. On the other hand, administrators may also embed programming language statements into meta-information structures if the administrators deem that to be the most efficient design for the system being developed or modified. At run-time, the rules engine can convert the data elements of the meta-information structures along with programming language statements (if any) automatically into executable code for the application.

Thus, in some embodiments rules may be the primary artifacts that get created, stored (e.g., in the rules base) or otherwise manipulated to define or modify the overall functionality of rules-based enterprise applications. The enterprise applications may automate or manage various types of work in different business domains at run-time. By way of non-limiting example, rules stored in the rules base may be configured to define aspects of an enterprise application. For example, rules can define the user interface, decision logic, integration framework, process definition, data model, reports, or security settings of a given enterprise application.

The transactional database can include databases of the type known in the art (albeit configured in accord with the teachings herein) for storing corporate, personal, governmental, or other data. Rules such as in the rules base may generate, update, transform, delete, store, or retrieve the data (herein collectively referred to as "processing" the data). Example data may include financial data; customer records; personal data; design-time, development-time, or runtime data related to an application; or other types of data. The transactional database may store the data in tables, database records, or database objects, for example.

The transactional database may be present in any given embodiment. Conversely, some embodiments may use multiple transactional databases, e.g., an enterprise-wide database accessible to server 120 and branch-office specific databases accessible to customer client 122 or representative client 132, by way of non-limiting example. If multiple transactional databases are provided in a given embodiment, the transactional databases may be of like architecture and operation; though, they may have differing architecture or operation, as well.

The rules engine can be of the type conventionally known in the art (albeit configured in accord with the teachings herein) for use in processing or executing rules from the rules base to process data in (or for storage to) the transactional database, e.g. in connection with events signaled to or detected by the rules engine. Preferred such rules engines are of the type described in U.S. Pat. No. 5,826,250, entitled "Rules Bases and Methods of Access Therein," U.S. Pat. No. 7,640,222, entitled "Rules Base Systems and Methods with Circumstance Translation," and U.S. Pat. No. 8,250,525, entitled "Proactive Performance Management For Multi-User Enterprise Software Systems," all of which are incorporated by reference in their entirety herein. The rules engine may be implemented in a single software program, multiple software programs or modules, or a combination of software modules or programs. The rules engine may comprise programming instructions, scripts, or rules (e.g., rules stored in the rules base) or a combination therein.

Some embodiments of the rules engine may execute on or over multiple digital data processors. For example, selective sharing system 142 may invoke the rules engine for execution on a single digital data processor (e.g., a digital data processor on server 120, customer client 122, or representative client 132). Subsequently, selective sharing system 142 may apportion, distribute, or execute portions of the rules engine (or, potentially, the entirety of the rules engine) over multiple digital data processors.

Other ways of implementing or executing the rules engine are also possible. By way of non-limiting example, the rules engine may have additional distinct components or portions that can be apportioned and distributed separately. Non-limiting example components include a data access component for processing data during rule execution, a session management component for keeping track of activity across sessions of interaction with a digital data processor, or a performance monitoring component for monitoring and interacting with various system resources or event logs to manage performance thresholds.

Network 124 can include one or more networks of the type commercially available in the marketplace or otherwise suitable for supporting communication between customer client 122 or representative client 132, web server 134, and server 120 in accord with the teachings herein. Network 124 can be wired or wireless, a cellular network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), or a network operating in accordance with existing IEEE 802.11, 802.11a, 802.11b, 802.11g, 802.11n, 802.11ac, 802.16, 802.16d, 802.16e, 802.16m standards or future versions or derivatives of the above standards.

Figure 2:
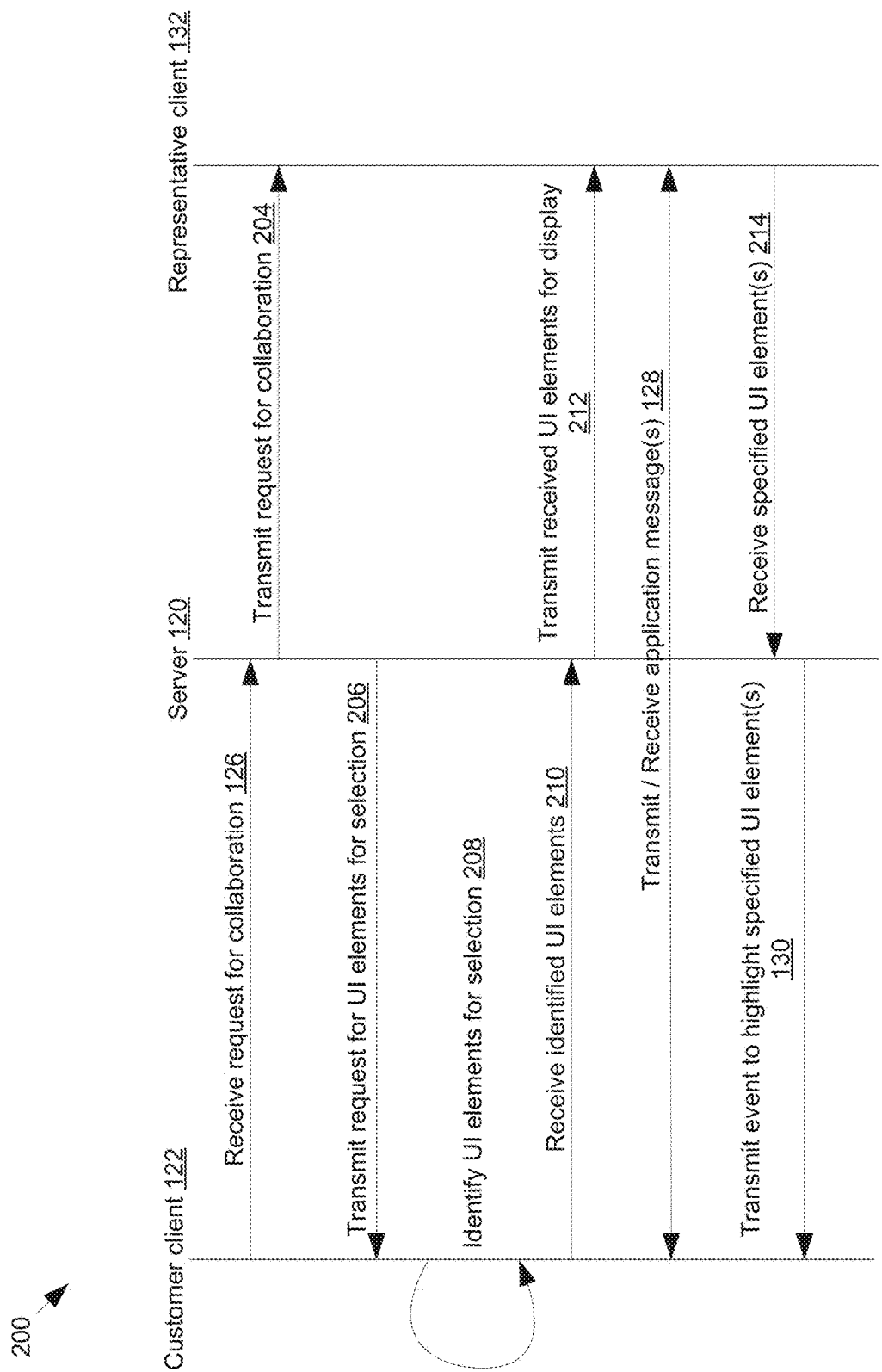
FIG. 2 illustrates an example message flow for selective sharing in accordance with some embodiments of the present invention.

FIG. 2 illustrates an example message flow 200 for selective sharing in accordance with some embodiments of the present invention. Customer client 122 transmits and receives messages in communication with server 120. Server 120 transmits and receives messages in communication with representative client 132.

Server 120 receives a request 126 for collaboration from customer client 122. Upon receiving request 126 for collaboration, server 120 transmits a request 204 for collaboration to representative client 132. Some embodiments of requests 126, 204 for collaboration may reference or contain a customer identifier representing the customer using customer client 122, or a page identifier, section identifier, or other identification of the UI section over which the customer desires to collaborate. Server 120 transmits a request 206 for UI elements to customer client 122. In some embodiments, when the customer application and collaboration application operate using web pages, customer client 122 and representative client 132 interact with requests and events by importing a JavaScript library configured to parse objects and events, and ultimately perform the selective sharing described herein.

Upon receiving request 206 for UI elements, customer client 122 identifies and selectively shares UI elements for display 208 in a collaboration application executing on representative client 132. In one embodiment, customer client 122 identifies all UI elements displayed in the customer application. For example, if the customer application is an online shopping cart displayed in a web browser, customer client 122 might identify and transmit all document object model (DOM) elements in the DOM tree. However, doing so may present an overly long and unwieldy collection in the collaboration application executing on representative client 132. Accordingly, some embodiments of customer client 122 identify a subset of all UI elements. For example, one such embodiment of customer client 122 might provide a client-side application programming interface (API) allowing administrators to tag or otherwise identify UI elements of interest in advance. Accordingly, when rendering a UI for the customer application in a web browser, the client-side API might result in adding a unique class to each tagged UI element in the DOM tree. One non-limiting example class might be "xray." Customer client 122 can thus identify each UI element using cascading style sheet (CSS) selectors to select all DOM tree elements with class "xray." The "xray" class name can refer to a characterization that the UI elements identified from customer client 122 represent an x-ray "inside" the customer application. In other embodiments, customer client 122 may store and reference historical data about previously highlighted UI elements. For example, customer client 122 may track historical data based on the same section of the user interface where previously highlighted UI elements have assisted other customers, or based on a customer identifier where previously highlighted UI elements have assisted the specific customer. In further embodiments, customer client 122 uses initial validation data received from the customer application to suggest UI elements for selection. Customer client 122 may include suggested UI elements in the collection, with properties or metadata that indicate the UI elements are suggested selections.

Server 120 receives event 210 containing the identified and selectively shared UI elements from customer client 122. For example, customer client 122 may transmit the identified UI elements using a JavaScript object notation (JSON) object. Upon receiving event 210 with the identified UI elements, server 120 transmits event 212 containing the received UI elements to representative client 132 for display in the collaboration application. For example, the collaboration application may be a chat application, and representative client 132 may display the received UI elements in a list for selection by the customer service representative. In some embodiments, instead of creating a new event 212, server 120 forwards event 210 containing the identified UI elements from customer client 122 to representative client 132 as event 212.

Some embodiments of customer client 122 may identify the UI elements 208 for selection prior to transmitting request 126 for collaboration. The identified UI elements may be included in the initial request for collaboration, and selective sharing message flow 200 may combine request 126 for collaboration with event 210 containing the identified UI elements. In such embodiments, server 120 may also omit request 206 for UI elements, and combine request 204 for collaboration with event 212 containing the received UI elements, transmitting a combined request to representative client 132.

Representative client 132 and customer client 122 proceed to exchange application messages 128. Non-limiting example application messages may include chat messages exchanged between the customer and customer service representative. The chat messages may be transmitted and received according to a chat protocol such as session initiation protocol or session initiation protocol for instant messaging and presence leveraging extensions (SIP/SIMPLE), or extensible messaging and presence protocol (XMPP) and displayed using the respective JavaScript libraries for customer client 122 and representative client 132. Other chat protocols as known in the art are within the scope of selective sharing message flow 200. Application messages 128 may also include messages that facilitate collaborative application usage such as full collaborative web browsing or co-browsing, or screen sharing with the customer service representative as is known in the art.

Server 120 may receive event 214 containing selected UI elements from representative client 132. For example, event 214 containing selected UI elements may be a JSON object containing each UI element that the customer service representative has selected. Server 120 transmits a UI element highlighting event 130 containing the selected UI elements to customer client 122. Customer client 122 retrieves the UI elements from UI element highlighting event 130 selected by the customer service representative, and proceeds to highlight the selected UI elements in the user interface of the customer application executing on customer client 122.

Requests 126, 204 for collaboration, request 206 for UI elements for selection, events 210, 212 containing identified UI elements, application messages 128, event 214 containing selected UI elements, and UI element highlighting event 130 may be transmitted to and from server 120, customer client 122, and representative client 132 using, for example, a communication protocol such as transmission control protocol/Internet protocol (TCP/IP). Other communication protocols are known in the art and are within the scope of selective sharing message flow 200.

Figure 3:
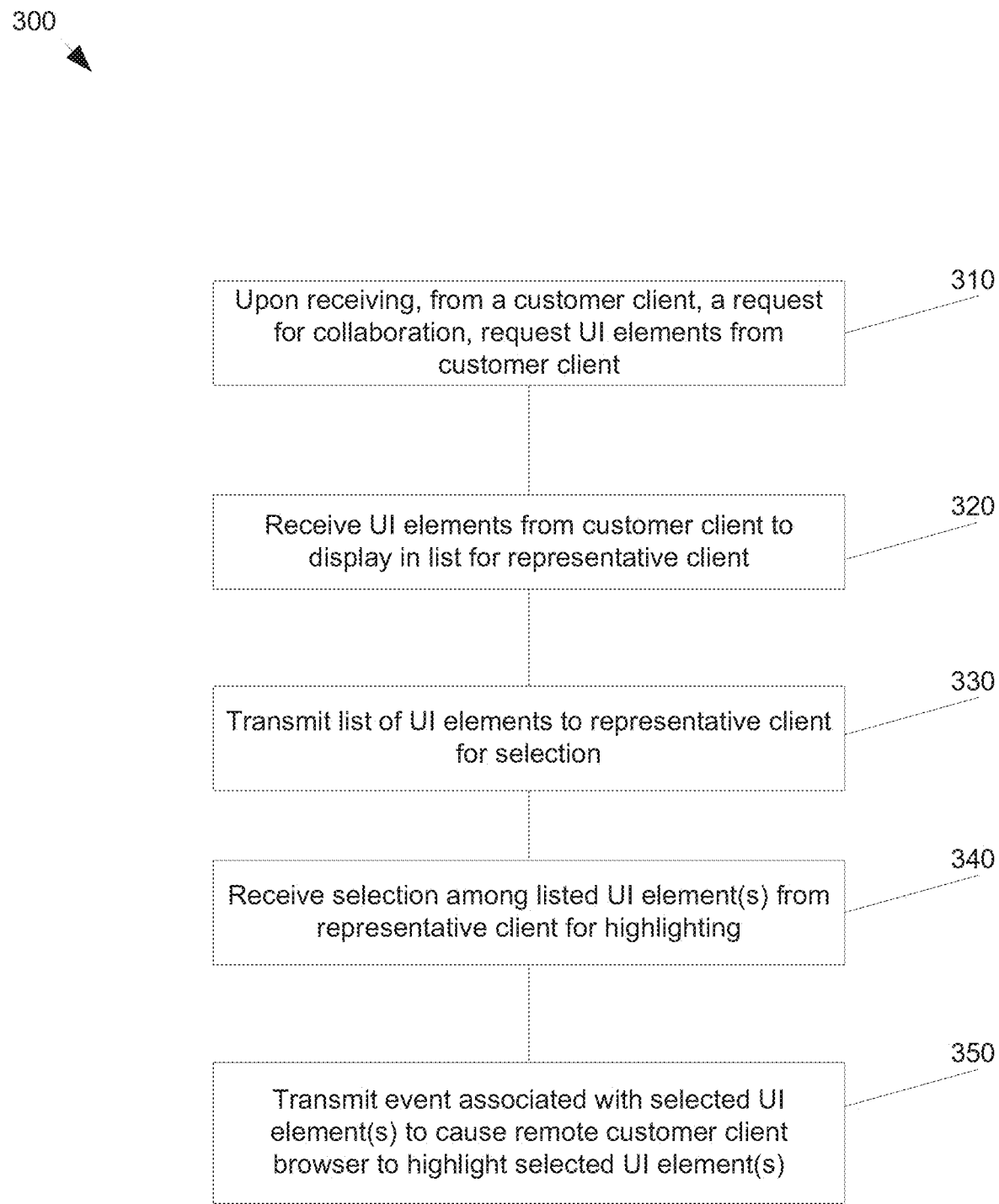
FIG. 3 illustrates an example selective sharing method in accordance with some embodiments of the present invention.

FIG. 3 illustrates an example selective sharing method 300 in accordance with some embodiments of the present invention.

Upon receiving, from a customer client, a request for collaboration, the server transmits a request for UI elements to the customer client (step 310). The server receives, from the customer client, a collection of UI elements associated with a user interface displayed in a customer application on the customer client (step 320). The customer client identifies the collection of UI elements. In some embodiments, the customer client transmits all UI elements displayed in the customer application, or all UI elements displayed in a viewport or window of the customer application. In other embodiments, the customer client identifies and selectively shares a subset of UI elements for transmission to the server. For example, if the user interface is a web page defined using hypertext markup language (HTML), then the customer client can identify UI elements for the collection based on UI characteristics such as markup attributes or content position on the web page. The customer client can also identify UI elements for the collection based on a UI definition such as a document object model (DOM) tree structure for the web page. Additionally, the customer client can use historical data from the customer client or the representative client to identify UI elements. In further embodiments, the customer client uses initial validation data received from the customer application to suggest UI elements for selection. The customer client may include suggested UI elements in the collection, using properties or metadata that indicate the UI elements are suggested selections. In some embodiments, the server receives the collection of UI elements in a JSON object.

The server transmits, to the representative client, the collection of UI elements for the customer service representative to select (step 330). In some embodiments, the server transmits a JSON object that contains the UI elements or forwards the JSON object received from the customer client. The representative client may display the collection of UI elements in a UI on the collaboration application. The selective sharing system allows the customer service representative to indicate a selection among the selectively shared UI elements displayed in the collaboration application. The server receives, from the representative client, a selection for highlighting among the collection of UI elements (step 340). The server transmits, to the customer client, the selected UI elements for highlighting (step 350). The customer client may proceed to highlight or otherwise visibly identify the UI elements selected by the customer service representative. In some embodiments, the highlighting may include updating a UI definition of the customer application executing on the customer client.

Figure 4:
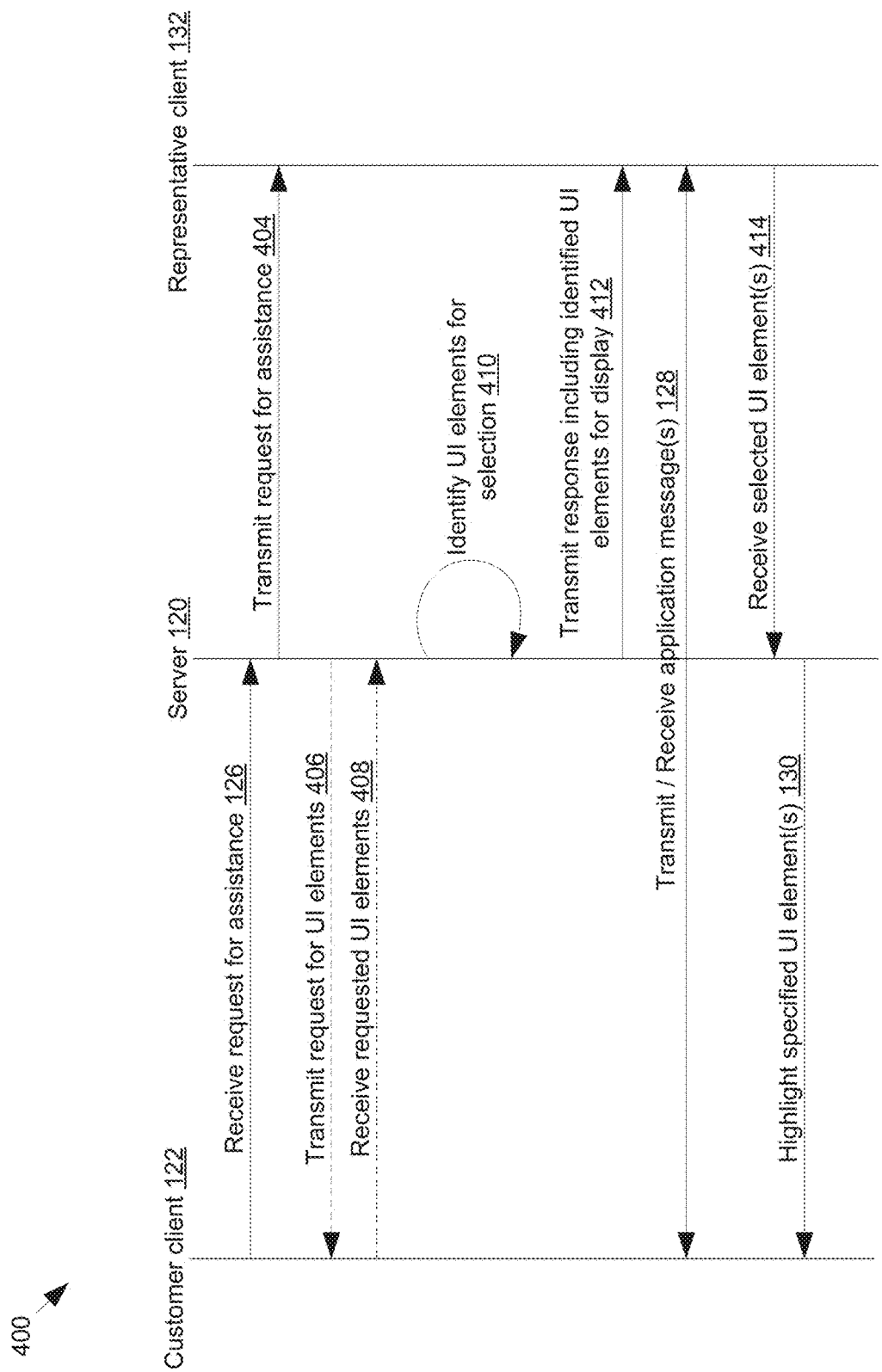
FIG. 4 illustrates an example message flow for selective sharing in accordance with some embodiments of the present invention.

FIG. 4 illustrates an example message flow 400 for selective sharing in accordance with some embodiments of the present invention. Customer client 122 transmits and receives messages in communication with server 120. Server 120 transmits and receives messages in communication with representative client 132.

Server 120 receives a request 126 for collaboration from customer client 122. Upon receiving request 126 for collaboration, server 120 transmits a request 404 for collaboration to representative client 132. Some embodiments of requests 126, 404 for collaboration may reference or contain a page identifier, section identifier, or other identification of the user interface section over which the customer desires to collaborate. Further embodiments of requests 126, 404 for collaboration may also reference or contain a customer identifier representing the customer who is using customer client 122. In some embodiments, when the customer application and collaboration application operate using web pages, customer client 122 and representative client 132 interact with requests and events by importing a JavaScript library configured to parse objects and events, and ultimately perform the selective sharing described herein.

In some embodiments, server 120 transmits request 406 for UI elements to customer client 122. Server 120 receives response 408 from customer client 122 containing the requested UI elements. Response 408 containing the requested UI elements can contain a collection of all UI elements displayed by the user interface corresponding to the customer application. Alternatively, response 408 can include a subset of UI elements identified by customer client 122. Some embodiments of server 120 proceed to identify a subset of UI elements 410 for selective sharing and transmission to representative client 132. For example, server 120 may identify the UI elements based on historical data about previously highlighted UI elements and prior customer collaboration or representative collaboration, UI characteristics, or a UI definition. The UI characteristics can include markup attributes or properties, or content position in the user interface for the customer application. The UI definition can include a tree structure for the UI. In further embodiments, server 120 receives initial validation data from the customer application on customer client 122 and uses the validation data to suggest UI elements for selection. Server 120 may then include suggested UI elements in the collection, with properties or metadata that indicate the UI elements are suggested selections.

In still further embodiments, server 120 omits transmitting request 406 for UI elements and receiving response 408 containing the requested UI elements. Instead, server 120 identifies UI elements 410 for selective sharing and selection based on the page identifier or section identifier for the UI section displayed by the customer application. For example, an administrator may configure a data structure that maps between page or section identifiers, and UI elements to transmit for selection. Some embodiments of server 120 may further apply the criteria described above regarding historical data, UI characteristics, or UI definition structure to filter the UI elements identified from the data structure.

Server 120 proceeds to transmit event 412 containing the identified UI elements to representative client 132 for display in the collaboration application. For example, the collaboration application may be a chat application, and representative client 132 may display the received UI elements in a list for selection by the customer service representative.

Representative client 132 and customer client 122 proceed to exchange application messages 128. Non-limiting example application messages may include chat messages sent between the customer and customer service representative. The chat messages may be transmitted and received according to a chat protocol such as session initiation protocol or session initiation protocol for instant messaging and presence leveraging extensions (SIP/SIMPLE), or extensible messaging and presence protocol (XMPP). Other chat protocols as known in the art are within the scope of selective sharing message flow 400. Application messages 128 may also include messages that facilitate collaborative application usage such as collaborative web browsing or co-browsing, or screen sharing with the customer service representative as is known in the art.

Server 120 may receive event 414 containing selected UI elements from representative client 132. For example, event 414 containing selected UI elements may be a JSON object containing each UI element that the customer service representative has selected. Server 120 transmits UI element highlighting event 130 containing the selected UI elements to customer client 122. Customer client 122 retrieves the UI elements from UI element highlighting event 130 selected by the customer service representative, and proceeds to highlight the selected UI elements in the user interface of the customer application executing on customer client 122.

Requests 126, 404 for collaboration, request 406 and response 408 for UI elements for selection, response 412 containing identified UI elements, application messages 128, event 414 containing selected UI elements, and UI element highlighting event 130 may be transmitted to and from server 120, customer client 122, and representative client 132, for example, using a communication protocol such as transmission control protocol/Internet protocol (TCP/IP). Other communication protocols as known in the art are within the scope of selective sharing message flow 400.

Figure 5:
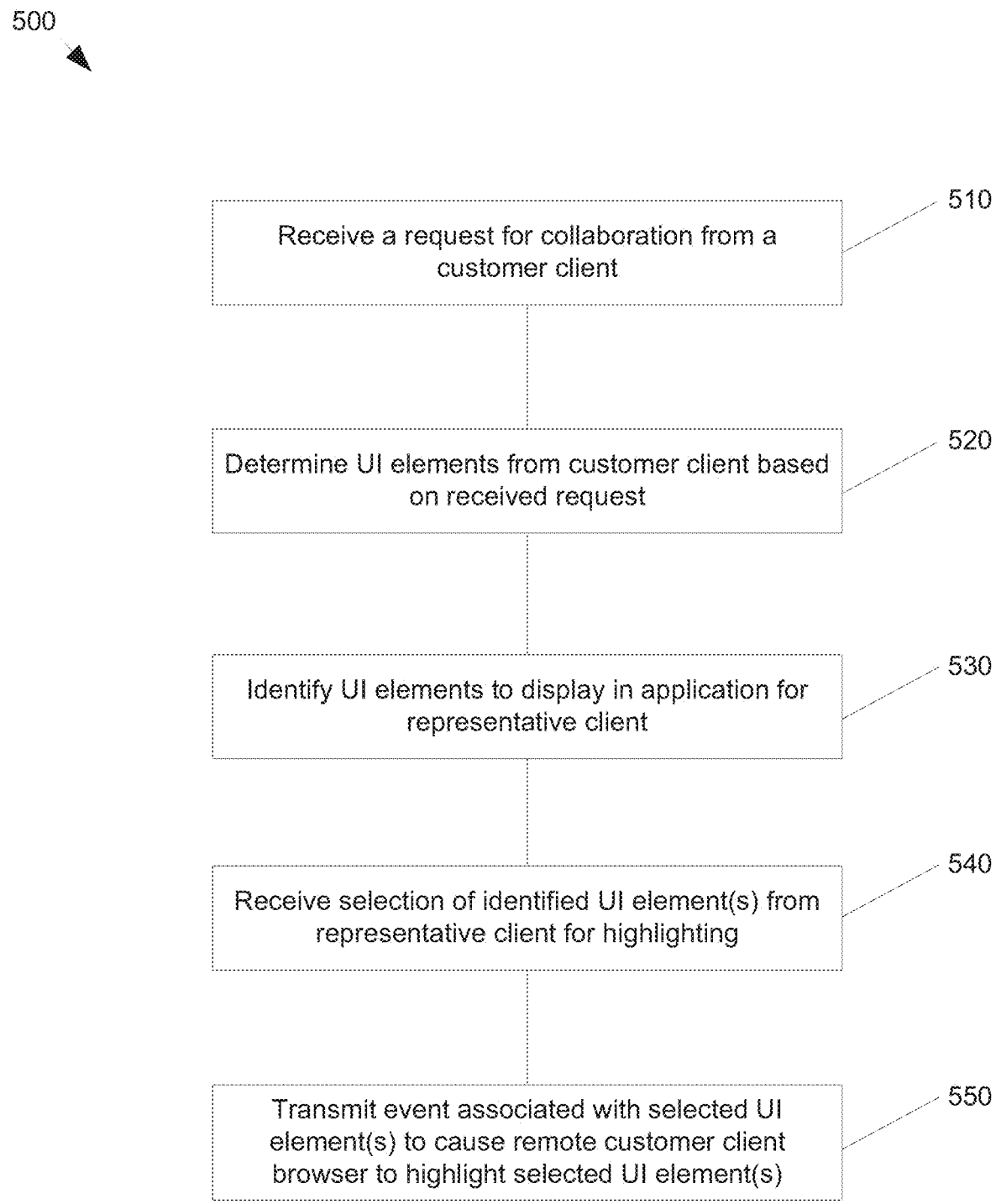
FIG. 5 illustrates an example method for selective sharing in accordance with some embodiments of the present invention.

FIG. 5 illustrates an example method 500 for selective sharing in accordance with some embodiments of the present invention.

A server receives, from a customer client, a request for collaboration (step 510). Based on the request, the server determines a collection of UI elements associated with a user interface displayed in a customer application on the customer client (step 520). In some embodiments, the received request includes an enumeration of UI elements from the customer client in a JSON object. The received request may contain all or a subset of UI elements displayed in the customer application or in a viewport or window of the user interface.

Based on the collection, the server identifies UI elements for display in the remote collaboration application (step 530). Some embodiments of the server identify all UI elements. Other embodiments of the server identify a subset of UI elements. In still further embodiments, the selective sharing system allows an administrator to configure the collection of UI elements for selective sharing. The server may retrieve the pre-configured collection of UI elements based on a page identifier or section identifier received in the request. In yet further embodiments, if the user interface in the customer application is a web page defined using hypertext markup language (HTML), then the received request may include partial or full HTML and the server may identify UI elements for selective sharing based on UI characteristics including markup attributes or content position on the web page. In some embodiments, the received request may include a partial or full UI definition based on a tree structure, such as a document object model (DOM) tree structure for the customer application user interface. The server may identify UI elements for selective sharing based on the tree structure received in the request. Additionally, the server may identify UI elements for selective sharing using historical data available from the customer client or the representative client. In further embodiments, the server uses initial validation data received from the customer application to suggest UI elements for selection. The server may include suggested UI elements in the collection, using properties or metadata that indicate the UI elements are suggested selections.

The server transmits, to the representative client, the collection of UI elements for the customer service representative to select. In some embodiments, the server transmits a JSON object that contains the UI elements. The representative client may display the collection of UI elements in a user interface on the collaboration application. The selective sharing system allows the customer service representative to indicate a selection among the UI elements displayed in the collaboration application.

The server receives, from the representative client, a selection of UI elements for highlighting in the customer application (step 540). The server transmits, to the customer client, the selected UI elements for highlighting (step 550). The customer client may proceed to highlight the UI elements selected by the customer service representative. In some embodiments, the highlighting may include updating a UI definition of the customer application executing on the customer client.

Figure 6:
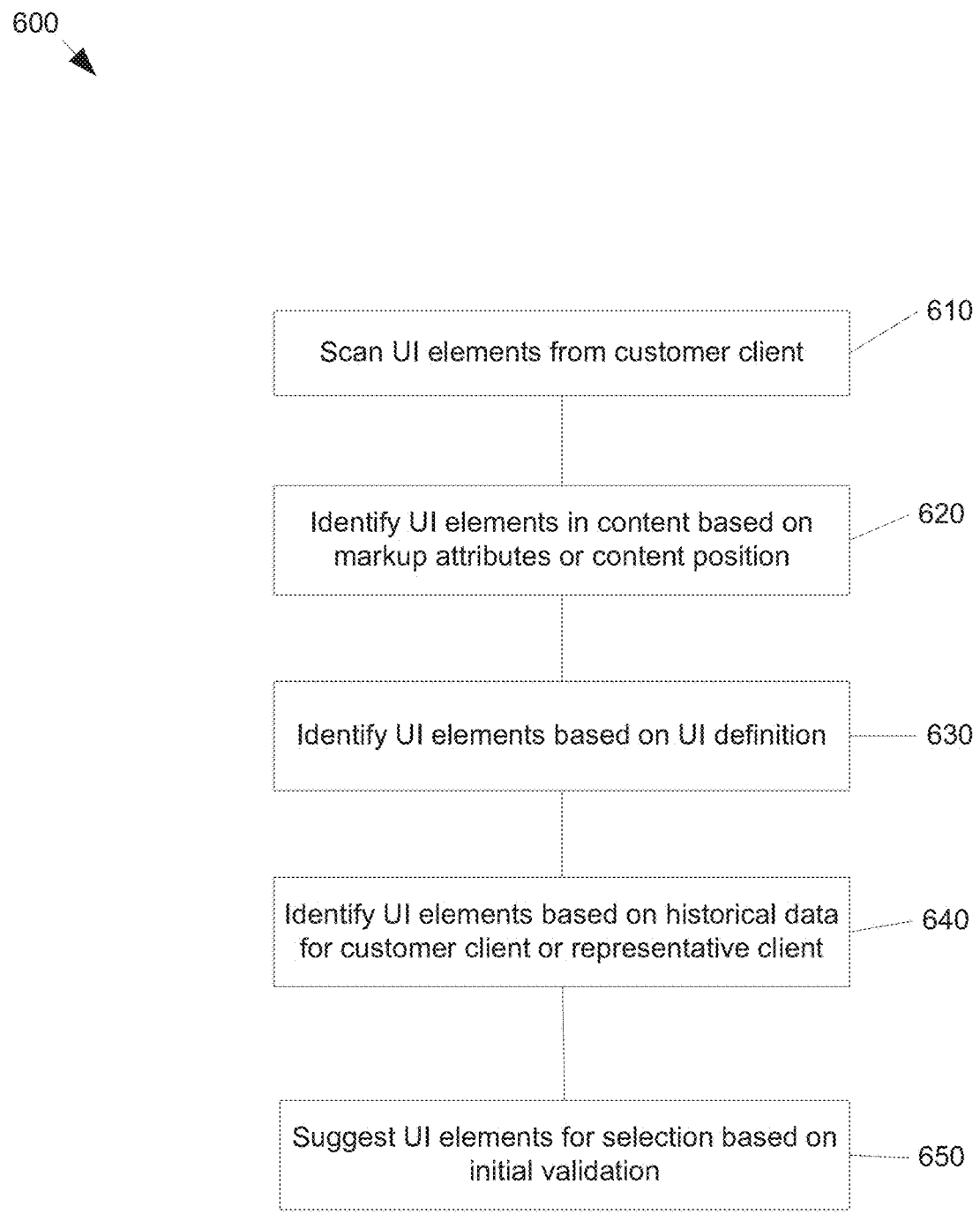
FIG. 6 illustrates an example method for identifying UI elements for selective sharing in accordance with some embodiments of the present invention.

FIG. 6 illustrates an example method 600 for identifying UI elements for selective sharing in accordance with some embodiments of the present invention.

Method 600 begins with scanning UI elements from the customer client (step 610). In some embodiments, the customer client enumerates all UI elements displayed in the user interface for the customer application, or all UI elements displayed in a viewport or window of the user interface.

The selective sharing system proceeds to analyze the scanned UI elements from the customer client. The customer client, server, or representative client may perform the analysis. In some embodiments, the selective sharing system identifies UI elements for selective sharing based on markup attributes or position in content displayed in the customer application (step 620). For example, if the UI definition for the customer application is implemented in hypertext markup language (HTML), the selective sharing system may determine important links or text on the user interface based on <ul>, <ol>, <li>, or <dl> HTML tags that identify UI elements being displayed in a list. The selective sharing system may also identify UI elements enclosed in HTML text formatting tags such as <b>, <strong> for bold, <i> or <em> for italics or emphasis, <u> or <ins> tag for underlining, <mark> tag for highlighting, <del> tag for strikethrough, "align" attributes in <p> tags for text alignment, or <font> tags and attributes for text colors, fonts, and other attributes. If the UI definition is further implemented using cascading stylesheets, the selective sharing system may identify UI elements based on analyzing the CSS. For example, the selective sharing system may identify UI elements based on CSS "color" for text color, "text-align" for text alignment, "text-decoration" for other text decorations such as overlines, underlines, or strikethrough, or other CSS properties that modify text.

In some embodiments, the selective sharing system identifies UI elements for selective sharing based on a UI definition corresponding to the UI of the customer application (step 630). If the customer application is implemented using a web page, a non-limiting example UI definition may include a document object model (DOM) tree for the web page. The markup attributes described earlier may be represented in a web browser using a DOM tree. Accordingly, the selective sharing system may traverse the tree structure of the DOM to identify potential UI elements for selective sharing. The tree structure allows the selective sharing system to react to HTML events in the web page that might not be able to be represented as markup attributes. For example, the selective sharing system might determine based on the tree structure that the customer's mouse pointer is resting over an error message, and identify the error message as a UI element for the customer service representative to highlight remotely. Furthermore, some embodiments of the selective sharing system can also analyze the UI definition to identify UI elements corresponding to required fields or user-interactable fields (e.g., fields that accept user input). In still further embodiments, the selective sharing system may analyze the UI definition to identify a "checkout" or "submit" link or button, difficult-to-find links or elements in the UI, or video or audio.

In some embodiments, the selective sharing system identifies UI elements for selective sharing based on historical data for customer clients or representative clients (step 640). For example, based on historical data for customer clients, the selective sharing system may identify UI elements that other customers, either individually or in the aggregate, have frequently requested collaboration on previously. Alternatively, based on historical data for representative clients, the selective sharing system may identify UI elements that other customer service representatives, either individually or in the aggregate, have remotely highlighted previously. Accordingly, some embodiments of the selective sharing system can analyze the UI definition to identify UI elements corresponding to frequently used fields.

In some embodiments, the selective sharing system suggests UI elements for selection using initial validation data (step 650). Traditionally, customer applications and web pages can perform client-side validation on field values in the web browser, without needing to transmit the field values to a server. For example, traditional validation can include verifying the number of digits in a phone number or credit card, verifying password requirements such as password length and number of uppercase or lowercase characters or symbols, verifying the type of data that the customer has entered (e.g., text in a numeric or date field), verifying minimum or maximum values, or verifying that required UI fields are filled in with values prior to submission of the form. Some embodiments of the selective sharing system are able to use results of initial validation to suggest UI elements for selection in the collaboration application. For example, the selective sharing system can determine the field and field label corresponding to an initial validation error (e.g., Phone number, Credit card number). The selective sharing system can suggest the UI element for selection that caused the initial validation error. For example, the selective sharing system may suggest the Phone number UI element for selection in the collaboration application. Traditional client-side validation might stop after identifying a field that fails to validate. In contrast, based on the corresponding field label, the selective sharing system may search the collection of UI elements to identify related UI elements that contain a portion of the field label. For example, if the selective sharing system receives an initial validation error relating to the Phone number field, the selective sharing system can suggest UI elements for selection that contain a portion of the field label "Phone number." One example might be a related error message UI element "Credit card error (phone number)." The selective sharing system is able to provide improved assistance to the customer by suggesting all related UI elements to the representative for selective sharing in the customer application UI. In some embodiments, the selective sharing system may allow an administrator to pre-configure related UI elements, and retrieve the pre-configured related UI elements from a mapping between UI elements in the collection.

Figure 7:
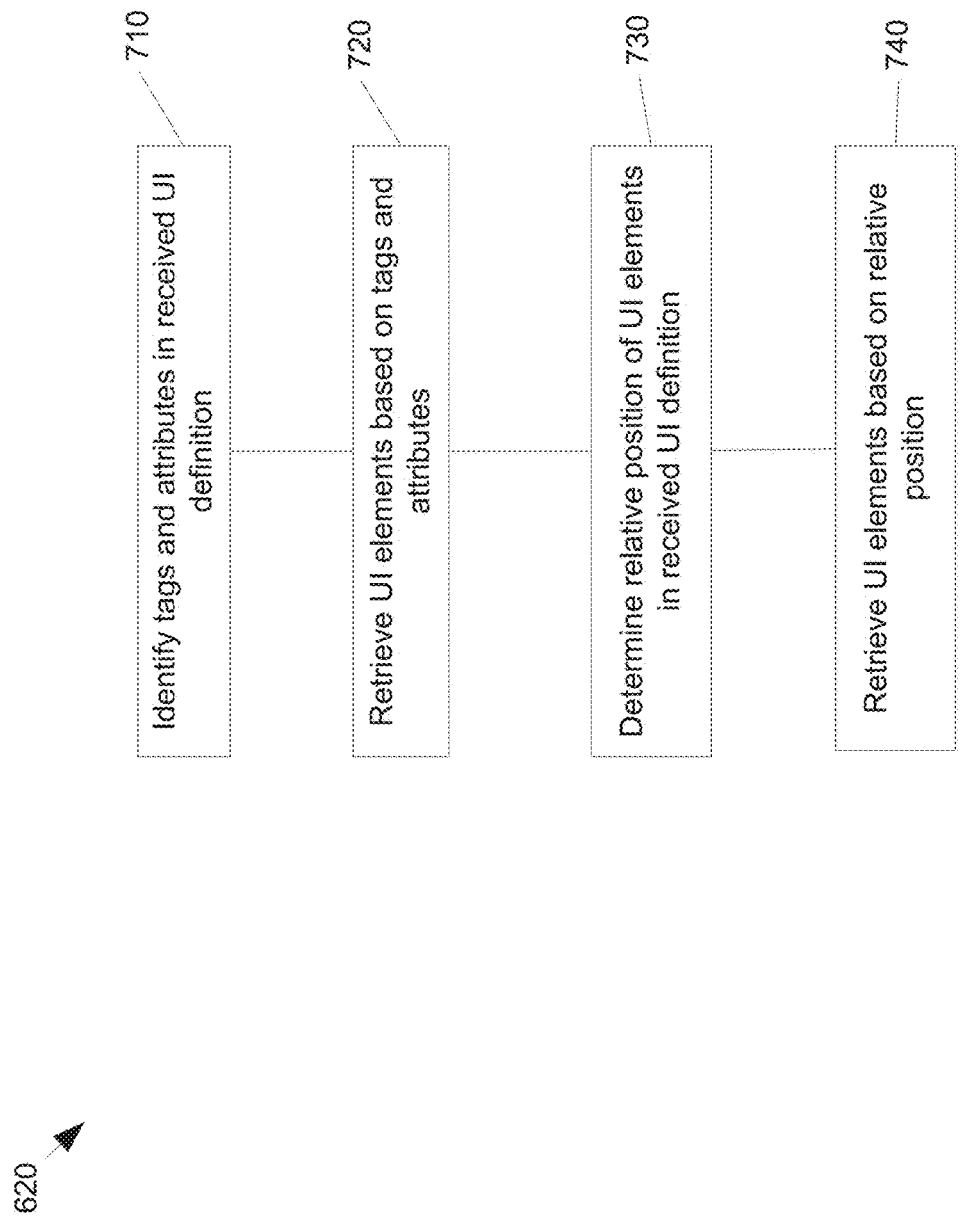
FIG. 7 illustrates an example method for identifying UI elements based on markup attributes and content position for selective sharing in accordance with some embodiments of the present invention.

FIG. 7 illustrates an example method 620 for identifying UI elements based on markup attributes and content position for selective sharing in accordance with some embodiments of the present invention. Method 620 begins by identifying tags and attributes in the received UI definition (step 710). For example, the UI definition for the customer application may be implemented in hypertext markup language (HTML). In some embodiments, the selective sharing system parses a document object model (DOM) tree to identify the tags and attributes which correspond to nodes in the DOM tree. In other embodiments, the selective sharing system parses elements in an HTML markup stream to identify the tags and attributes.

The selective sharing system retrieves UI elements based on the identified tags and attributes (step 720). For example, an administrator may pre-configure tags and attributes that indicate important links or text in the user interface. The administrator may create a collection of allowed tags and attributes, such as a whitelist. The whitelist may include <ul>, <ol>, <li>, or <dl> HTML tags that identify UI elements being displayed in a list. The whitelist may also include HTML text formatting tags such as <b>, <strong> for bold, <i> or <em> for italics or emphasis, <u> or <ins> tag for underlining, <mark> tag for highlighting, <del> tag for strikethrough, "align" attributes in <p> tags for text alignment, or <font> tags and attributes for text colors, fonts, and other attributes. For each tag or attribute, the selective sharing system may retrieve elements in the DOM tree using JavaScript function calls such as Document.getElementsByTagName( ) or Element.getElementsByTagName( ). These functions return DOM elements with a given tag name as identified UI elements, either all DOM elements in the HTML document, or DOM elements that are children of a given DOM element. To identify UI elements corresponding to attributes and attribute values, the selective sharing system can use JavaScript functions Document.querySelectorAll( ) or Element.querySelectorAll( ) to return DOM elements that match a given set of selectors. In some embodiments, the administrator may pre-configure the selectors to select attributes or attribute values of interest. If the UI definition is further implemented using cascading stylesheets, the selective sharing system may identify UI elements based on attributes defined in the CSS. For example, the selective sharing system may identify UI elements based on CSS "color" for text color, "text-align" for text alignment, "text-decoration" for other text decorations such as overlines, underlines, or strikethrough, or other CSS properties that modify text. The selective sharing system can create selectors that retrieve UI elements having the attributes described above.

In some embodiments, the selective sharing system determines a relative position of UI elements in the received UI definition (step 730). For example, the selective sharing system can request a length or count of all elements that use a given tag, attribute, or attribute value. Based on the length of the selected elements, the selective sharing system may determine that the relative position should be length/2. That is, the selective sharing system determines that the customer application has rendered elements with an index lower than length/2 relatively higher on the HTML page, and elements with an index higher than length/2 relatively lower on the page. Other relative positions may be used based on the length of the selected elements, such as length/5, length/4, or length/3. The selective sharing system identifies UI elements based on the relative position (step 740). For example, the selective sharing system may iterate through the UI elements until the selective sharing system reaches an index higher than the relative position.

Figure 8:
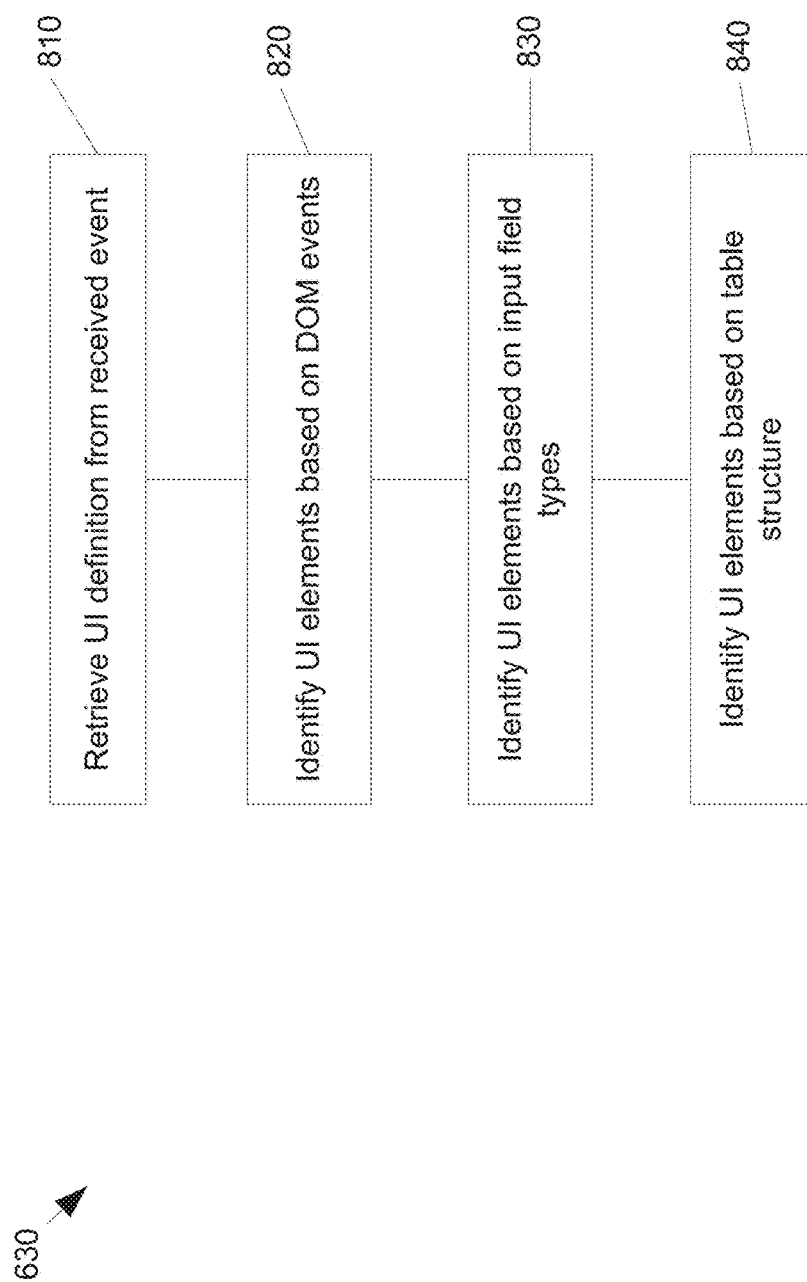
FIG. 8 illustrates an example method for identifying UI elements based on UI definition for selective sharing in accordance with some embodiments of the present invention.

FIG. 8 illustrates an example method 630 for identifying UI elements based on UI definition for selective sharing in accordance with some embodiments of the present invention.

If the customer application is implemented using a web page, a non-limiting example UI definition may include a document object model (DOM) tree for the web page. The markup attributes described earlier may be represented in a web browser using a DOM tree. Accordingly, the selective sharing system may retrieve and traverse the tree structure of the DOM to identify potential UI elements for selective sharing (step 810). The tree structure allows the selective sharing system to identify UI elements by reacting to hypertext markup language (HTML) events or DOM events in the web page (step 820). The HTML events and DOM events might not be able to be represented as markup attributes. For example, the selective sharing system may register an event listener to be notified of mouse events. The selective sharing system might thereby determine based on the tree structure that the customer's mouse pointer is resting over an error message, and identify the error message as a UI element for the customer service representative to highlight remotely.

Some embodiments of the selective sharing system can identify UI elements based on input field types (step 830). For example, the selective sharing system can analyze the UI definition to identify UI elements corresponding to input field properties, such as fields that require user input, or user-interactable fields that are capable of accepting user input. To identify fields that require user input, the remote system may check the value of the property HTMLInputElement.required. This property returns true if a field requires user input, and false otherwise. To identify fields capable of accepting user input, the remote system may check the value of the property HTMLInputElement.disabled or HTMLInputElement.readonly. These properties return true if a field does not accept user input, and false if the field is capable of accepting user input.

Some embodiments of the selective sharing system can identify UI elements based on table structure (step 840). Some customer applications can use a table structure to identify and display error messages. For example, the customer application UI definition might display multiple error messages using multiple table rows with one error message UI element per table row. The selective sharing system can use a JavaScript function Document.getElementsByTagName("tr") and Document.getElementsByTagName("td") to retrieve table rows with a <tr> HTML tag and individual table cells with a <td> tag.

Figure 9:
FIG. 9 illustrates an example method for identifying UI elements based on historical data for selective sharing in accordance with some embodiments of the present invention.

FIG. 9 illustrates an example method 640 for identifying UI elements based on historical data for selective sharing in accordance with some embodiments of the present invention.

Method 640 begins by retrieving a customer identifier or a representative identifier from a received event (step 910). The selective sharing system requests and receives, from the server, UI elements corresponding to historical data based on the retrieved customer identifier or representative identifier (step 920). For example, based on historical data for customer clients, the server may identify UI elements that other customers, either individually or in the aggregate, have frequently requested collaboration on previously. Alternatively, based on historical data for representative clients, the server may identify UI elements that other customer service representatives, either individually or in the aggregate, have remotely highlighted previously. Accordingly, some embodiments of the selective sharing system can identify UI elements corresponding to frequently used fields for customers or customer service representatives.

However, historical data for a given customer or representative can include a large and overwhelming number of UI elements. Accordingly, some embodiments of the selective sharing system may identify error messages in the customer application UI based on characteristics of the UI (step 930). The UI characteristics may include tags or attribute values, relative content position, or aspects of the UI definition. The selective sharing system may perform text analytics or text mining such as parsing the error messages to identify unique phrases or class names. For example, the selective sharing system may determine that an error message contains the unique phrases "credit card" or "phone number." Alternatively, the selective sharing system may determine that an error message is identified by the class name "address-error," representing an error message that might be displayed for an error corresponding to an Address field in the UI. Accordingly, the selective sharing system filters the list of UI elements identified by historical data based on the identified error message (step 940). For example, the selective sharing system may retain only UI elements that mention "credit card" or "phone number" based on the unique phrases in the identified error message, and remove other UI elements. Alternatively, the selective sharing system may retain only UI elements having the unique class name "address-error" based on the identified error message.

Figure 10:
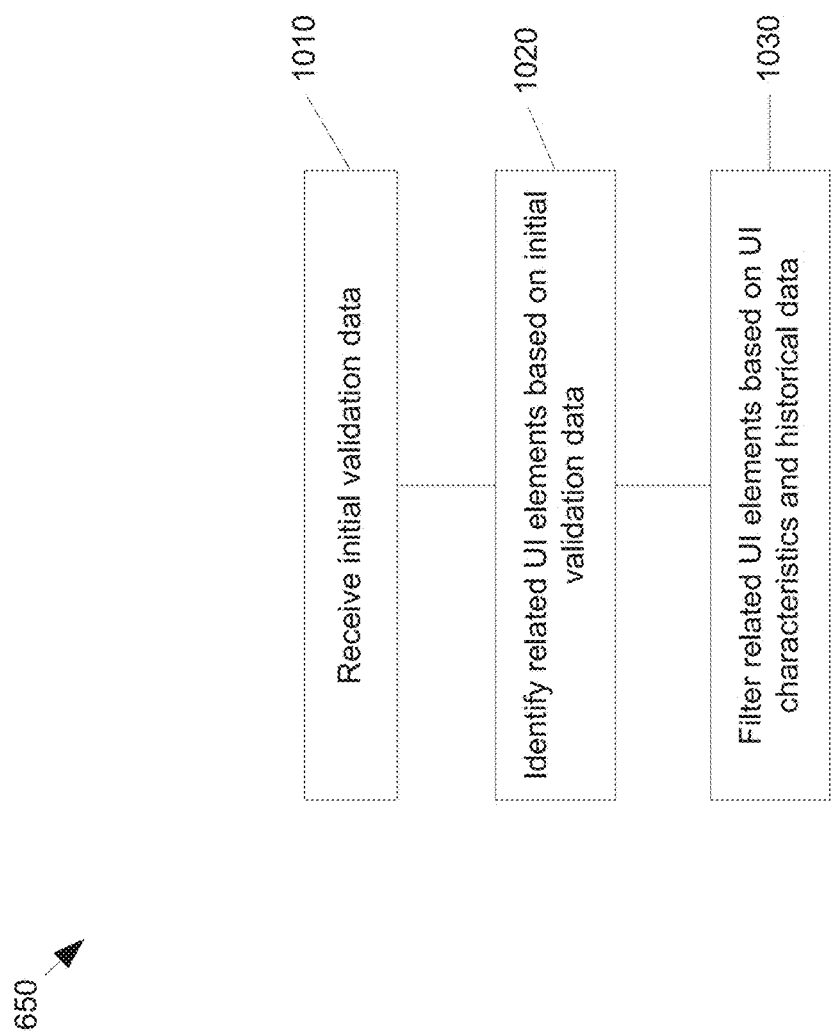
FIG. 10 illustrates an example method for suggesting UI elements for selection based on initial validation data for selective sharing in accordance with some embodiments of the present invention.

FIG. 10 illustrates an example method 650 for suggesting UI elements for selection based on initial validation data for selective sharing in accordance with some embodiments of the present invention.

Method 650 begins with receiving initial validation data (step 1010). In some embodiments, the selective sharing system may perform initial validation using JavaScript form validation, hypertext markup language (HTML) validation such as provided in HTML version 5, Ajax form validation, or client-side validation provided by other third-party libraries such as Drupal. The initial validation data can include client-side validation results, such as input validation or pattern matching. Non-limiting example input validation includes confirming an input type of text, date, number, telephone number, or uniform resource locator (URL). Non-limiting example pattern matching includes using regular expressions to represent patterns for matching. If the UI definition for the application executing on the customer client uses a document object model (DOM) tree in a web browser, the selective sharing system can identify initial validation data using JavaScript functions such as HTMLFormElement.checkValidity( ) or HTMLFormElement.reportValidity( ). The checkValidity( ) and reportValidity( ) methods return true if the element's child controls are subject to constraint validation and satisfy those constraints, or false if some controls do not satisfy their constraints. The methods can also fire an event named "invalid" corresponding to any control that does not satisfy its constraints, thus reporting client-side validity errors to the selective sharing system.

The selective sharing system identifies related UI elements based on the initial validation data (step 1020). For example, based on initial validation data identifying that a Home phone number field is invalid, the selective sharing system can identify related UI elements. Some embodiments of the selective sharing system can use text analytics or text mining to identify unique words and phrases from the initial validation data, such as "home phone" and "phone number." The selective sharing system can use the unique words and phrases to iterate through the customer application UI elements and parse the corresponding fields to identify related UI elements that mention "home phone" or "phone number." While the phrase "home phone" may not match any related UI elements, the phrase "phone number" may match the following UI elements: "Mobile phone number," "Work phone number," "Billing phone number," and an error message "Credit card error (phone number)."

However, identifying related UI elements can still result in a large list of potential UI elements to suggest for selection to the representative. The selective sharing system filters the collection of related UI elements based on UI characteristics and historical data (step 1030). For example, UI characteristics such as markup attributes and content position can identify the error message UI element "Credit card error (phone number)" as a related UI element that the selective sharing system should keep in the collection. The error message UI element may have different markup attributes such as being in a different text color and presented in close proximity to the "Billing phone number" field. Furthermore, historical data can confirm that the error message UI element "Credit card error (phone number)" is a UI element that other customer service representatives frequently select for selective sharing in the customer's application UI.

Figure 11:
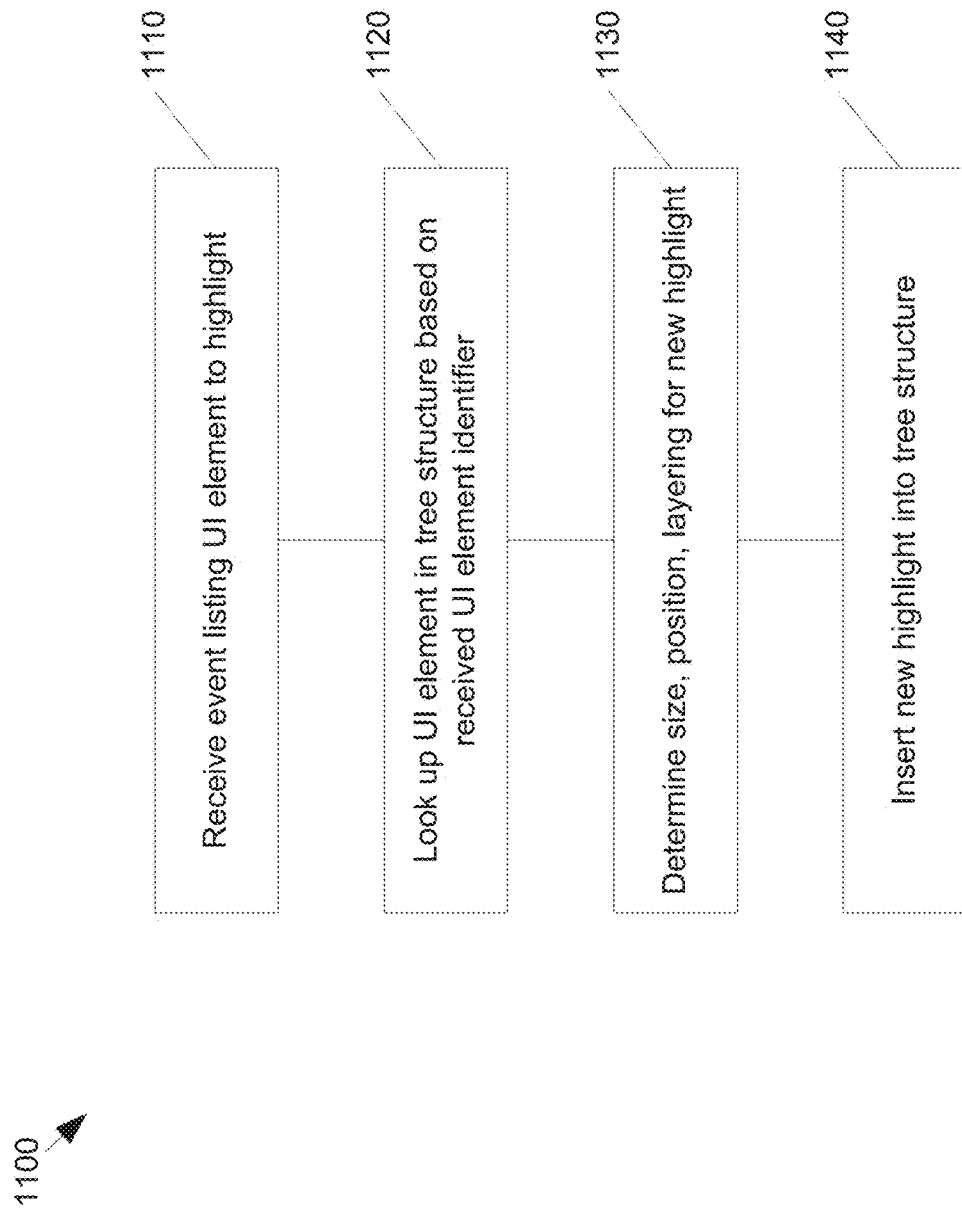
FIG. 11 illustrates an example method for selective sharing in accordance with some embodiments of the present invention.

FIG. 11 illustrates an example method 1100 for selective sharing in accordance with some embodiments of the present invention.

For the customer client, the selective sharing system assigns a customer-side unique identifier to each UI element displayed in the customer application. For example, the selective sharing system may assign a customer-side unique identifier to each document object model (DOM) element in the DOM tree. For the representative client, upon selecting a UI element for remote highlighting, the selective sharing system determines the corresponding customer-side unique identifier associated with the selected UI element in the customer's application. The selective sharing system constructs a remote highlighting event such as a JSON object including the customer-side unique identifier for the selected UI element. The selective sharing system transmits the remote highlighting event directly or indirectly from the representative client to the customer client. As a non-limiting example of indirect transmission, the selective sharing system may transmit the remote highlighting event from the representative client to the server, and from the server to the customer client.

The customer client receives the remote highlighting event containing the selected UI element to highlight (step 1110). For example, the customer client retrieves the customer-side unique identifier from the received event of the UI element selected by the representative. The customer client uses the customer-side unique identifier to look up the corresponding UI element in the tree structure for the user interface of the customer application (step 1120). For example, if the user interface for the customer application is implemented as a web page, the customer client retrieves the selected UI element from the DOM tree based on the customer-side unique identifier. The customer client can use a JavaScript function document.getElementById( ) to retrieve a DOM element that corresponds to a given identifier. The customer client uses JavaScript functions to determine a bounding box, position, and z-index for the selected UI element. The customer client determines a corresponding bounding box, position, and layer for the new highlight based on the selected UI element (step 1130). If the user interface for the customer application is implemented in a DOM tree, the customer client creates a new <div> element into the DOM tree. The <div> HTML tag is generally used to define a division or section in a web page. The division can have its own size, position, and layering on the web page. For example, the customer client may define the new division to be slightly wider (e.g., one pixel) along each side of the bounding box for the selected UI element, with the same center position as the selected UI element. For layering, the customer client may also configure the new division to have a z-index with a larger or smaller value than the z-index of the selected UI element, so as to display the new division in front of the selected UI element. The customer client can configure the new division to be partially transparent in color so that the selected UI element can be seen behind the new division. The customer client then inserts the newly created highlight into the tree structure (step 1140). For example, the customer client may insert the new division element into the DOM tree at the appropriate location in the tree, near the selected UI element. In some embodiments, the customer client modifies existing attributes or properties of the selected UI element to create the highlight, rather than inserting a new element into the DOM tree. For example, the customer client may modify background color or text color attributes or properties to create the highlight.

Figure 12:
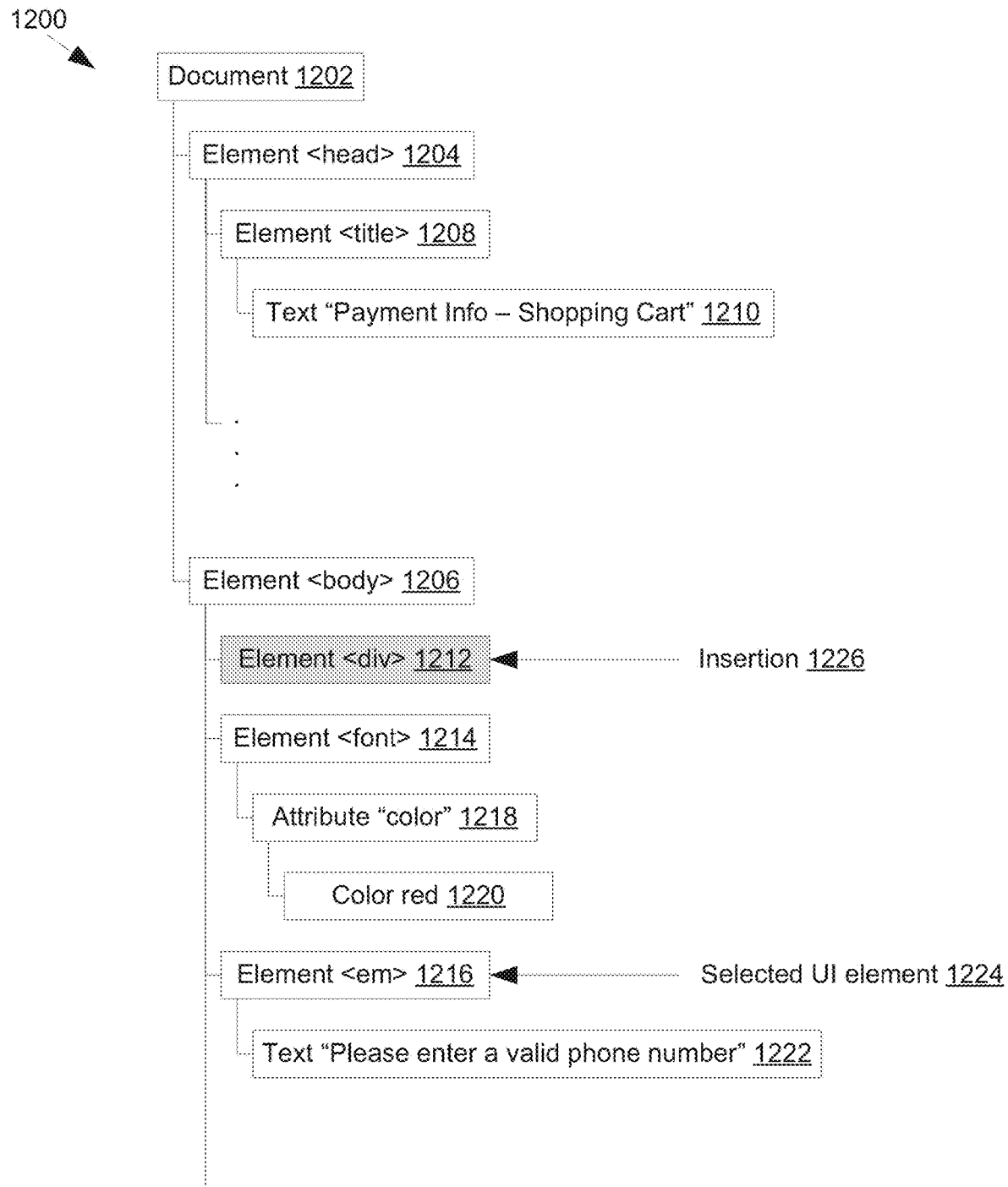
FIG. 12 illustrates an example tree structure for updating the UI definition for selective sharing in accordance with some embodiments of the present invention.

FIG. 12 illustrates an example tree structure 1200 for updating the UI definition for selective sharing in accordance with some embodiments of the present invention. As illustrated, tree structure 1200 represents a partial document object model (DOM) tree.

The web page corresponding to the UI for the customer application contains root document node 1202. Root document node 1202 contains head node 1204 and body node 1206. Head node 1204 contains metadata such as title 1208 of "Payment Info—Shopping Cart" 1210, author, and search terms for the web page. Body node 1206 contains example UI elements displayed in the customer application. Font element 1214 indicates that color attribute 1218 of the corresponding text will be red 1220. Emphasis element 1216 indicates that the corresponding text will be italicized, and text element 1222 contains the error message introduced in FIG. 1A, "Please enter a valid phone number."

The elements may have attributes for display in the UI, such as a size, position, bounding box size, or layer. Some embodiments of the selective sharing system also assign a customer-side unique identifier to some or all elements in the tree structure. The customer-side unique identifier allows the selective sharing system to identify a UI element selected by the customer service representative. For example, the customer service representative may select the error message corresponding to text 1222. The selective sharing system determines the smallest DOM element as selected UI element 1224, which is emphasis element 1216. The selective sharing system determines the bounding box size, position, and layer for emphasis element 1216. The selective sharing system creates insertion 1226 as new div element 1212 based on the bounding box size, position, and layer for emphasis element 1216. The selective sharing system inserts new div element 1212 into tree structure 1200. Alternative embodiments of the selective sharing system can highlight the selected UI element by modifying attributes or properties of an existing element, such as background color or color, instead of inserting a new div element.

Other embodiments are within the scope and spirit of the selective sharing systems and methods. For example, the selective sharing functionality described above can be implemented using software, hardware, firmware, hardwiring, or combinations of any of these. One or more digital data processors operating in accordance with instructions may implement the functions associated with selective sharing in accordance with the present disclosure as described above. If such is the case, it is within the scope of the selective sharing systems and methods that such instructions may be stored on one or more non-transitory computer-readable storage media (e.g., a magnetic disk, solid state drive, or other storage medium). Additionally, as described earlier, modules implementing functions may also be physically located at various positions, including being distributed such that portions of functions are implemented at different physical locations.

The selective sharing systems and methods are not to be limited in scope by the specific embodiments described herein. Indeed, other various embodiments of and modifications to the shape connecting, in addition to those described herein, will be apparent to those of ordinary skill in the art from the foregoing description and accompanying drawings. Thus, such other embodiments and modifications are intended to fall within the scope of the shape connecting systems and methods described herein. Furthermore, although the shape connecting has been described herein in the context of a particular implementation in a particular environment for a particular purpose, those of ordinary skill in the art will recognize that its usefulness is not limited thereto and that the shape connecting may be beneficially implemented in any number of environments for any number of purposes.

We claim:

1. A system for selectively sharing user interface elements in a user interface running on a first digital data processor, the system comprising:
    a browser application executing on a first digital data processor, the browser application rendering and displaying a user interface,
    a chat application executing on a second digital data processor,
    a server digital data processor in communication with the first and second digital data processors, wherein the server digital data processor is configured to:
        receive, from the first digital data processor, a collection of user interface elements associated with the user interface rendered and displayed by the browser application;
        transmit, to the second digital data processor, a subset of the collection of user interface elements for display and selection on the chat application executing on the second digital data processor; wherein the subset is selected from the collection of user interface elements based on at least one of: the historical data about the user interface running on the first digital data processor and the historical data about a user interface running on the second digital data processor,
        receive, from the second digital data processor, one or more user interface elements selected from among the subset of the collection of user interface elements by a user of the chat application; and
        transmit, to the first digital data processor, an event containing one or more unique identifiers corresponding to the one or more user interface elements selected by the user of the chat application,
    the first digital data processor is configured to:
        receive the event and retrieve the unique identifiers therefrom;
        use the unique identifiers to look up corresponding elements in a user interface definition for the user interface rendered and displayed on the browser application running on the first digital data processor;
        update the user interface definition to visibly identify at least one of the selected user interface elements on the user interface rendered and displayed by the browser application based on unique identifiers retrieved from the event and based on a size and a position of the at least one of the selected user interface elements in the user interface definition.

2. The system of claim 1, wherein the collection of user interface elements selected from among the subset includes user interface elements suggested for selection,
    wherein the user interface elements suggested for selection are determined by:
        identifying related user interface elements based on initial validation data.

3. The system of claim 2, wherein the identifying the related user interface elements based on the initial validation data includes
    identifying one or more unique phrases by performing text mining on the collection of user interface elements, and
    searching the collection of user interface elements for the one or more unique phrases.

4. The system of claim 1, wherein at least one of the server digital data processor, the first digital data processor, and the second digital data processor is further configured to update the user interface definition to include at least one new element to visibly identify the at least one of the selected user interface elements by:
    identifying a bounding box size of the selected one or more user interface elements,
    determining a corresponding bounding box size and a corresponding position for one or more regions of visible identification based on the size and the position of the selected one or more user interface elements,
    creating the one or more regions of visible identification using the corresponding bounding box size and the corresponding position, and
    inserting the one or more regions of visible identification into the user interface definition.

5. The system of claim 1, wherein the markup attributes corresponding to the user interface elements include at least one of <b>, <strong>, <i>, <em>, <u>, <ins>, <mark>, <del>, <font>, color, align, text-align, and text-decoration.

6. The system of claim 1, wherein the user interface definition includes at least one of a document object model (DOM) tree, hypertext markup language (HTML), and extensible markup language (XML).

7. The system of claim 6, wherein the user interface definition includes a tree structure of the DOM tree.

8. A system for selectively sharing user interface elements in a user interface running on a first digital data processor, the system comprising:
    a server digital data processor, wherein the server digital data processor is configured to:
        receive, from the first digital data processor that has a user interface running thereon, a collection of user interface elements associated with the user interface;
        identify a subset of the collection of user interface elements wherein the subset of user interface elements is identified by the server digital data processor based on at least one of: historical data about the user interface running on the first digital data processor and historical data about a user interface running on a second digital data processor;
        transmit, to the second digital data processor, the subset of user interface elements for selection on the second digital data processor;
        receive, from the second digital data processor, one or more user interface elements selected among the subset of user interface elements; and transmit, to the first digital data processor, an event containing the unique identifiers assigned by the system for the one or more selected user interface elements, the first digital data processor is configured to:
receive the event and retrieve the unique identifiers therefrom;
use the unique identifiers to look up corresponding elements in a user interface definition for the user interface running on the first digital data processor;
update the user interface definition to visibly identify at least one of the selected user interface elements on the user interface based on the unique identifiers retrieved from the event and based on a size and a position of the at least one of the selected user interface elements in the user interface definition.

9. The system of claim 8,
wherein the subset of user interface elements identified by the server digital data processor includes user interface elements suggested for selection,
wherein the user interface elements suggested for selection are determined by:
identifying related user interface elements based on initial validation data.

10. The system of claim 9, wherein the identifying the related user interface elements based on the initial validation data includes
identifying one or more unique phrases by performing text mining on the subset of user interface elements, and
searching the subset of user interface elements for one or more user interface elements containing the one or more unique phrases.

11. The system of claim 8, wherein at least one of the server digital data processor, the first digital data processor, and the second digital data processor is further configured to update the user interface definition to include at least one new element to visibly identify the at least one of the selected user interface elements by:
identifying a bounding box size of the selected one or more user interface elements,
determining a corresponding bounding box size and a corresponding position for one or more regions of visible identification based on the size and the position of the selected one or more user interface elements,
creating the one or more regions of visible identification using the corresponding bounding box size and the corresponding position, and
inserting the one or more regions of visible identification into the user interface definition.

12. The system of claim 8, wherein the markup attributes corresponding to the user interface elements include at least one of <b>, <strong>, <i>, <em>, <u>, <ins>, <mark>, <del>, <font>, color, align, text-align, and text-decoration.

13. The system of claim 8, wherein the user interface definition includes at least one of a document object model (DOM) tree, hypertext markup language (HTML), and extensible markup language (XML).

14. The system of claim 13, wherein the user interface definition includes a tree structure of the DOM tree.

15. A method for selectively sharing user interface elements in a user interface running on a first digital data processor, the method comprising:
executing a browser application on a first digital data processor, the browser application rendering and displaying a user interface,
executing a chat application on a second digital data processor,
receiving, from the first digital data processor, a collection of user interface elements associated with the user interface rendered and displayed by the browser application;
identifying a subset of the collection of user interface elements wherein the subset of user interface elements is identified by a server digital data processor based on at least one of: historical data about the user interface running on the first digital data processor and historical data about a user interface running on a second digital data processor;
transmitting, to the second digital data processor, the subset of user interface elements for display and selection on the chat application executing on the second digital data processor;
receiving, from the second digital data processor, one or more user interface elements selected among the subset of user interface elements by a user of the chat application; and
transmitting, to the first digital data processor, an event containing one or more unique identifiers assigned for the one or more user interface elements selected by the user of the chat application,
receiving the event and retrieving the unique identifiers therefrom;
using the unique identifiers to look up corresponding elements in a user interface definition for the user interface rendered and displayed on the browser application running on the first digital data processor;
updating the user interface definition for the user interface running on the first digital data processor to visibly identify at least one of the selected user interface elements on the user interface rendered and displayed by the browser application based on a size and a position of the at least one of the selected user interface elements in the user interface definition.

16. The method of claim 15,
wherein the identifying the subset of user interface elements includes suggesting user interface elements for selection by:
identifying related user interface elements based on initial validation data.

17. The method of claim 16, wherein the identifying the related user interface elements based on the initial validation data includes:
identifying one or more unique phrases by performing text mining on the subset of user interface elements, and
searching the subset of user interface elements for one or more user interface elements containing the one or more unique phrases.

18. The method of claim 15, wherein the user interface definition for the user interface running on the first digital data processor is updated to include at least one new element to visibly identify the at least one of the selected user interface elements by:
identifying a bounding box size of the selected one or more user interface elements,
determining a corresponding bounding box size and a corresponding position for one or more regions of visible identification based on the size and the position of the selected one or more user interface elements,
creating the one or more regions of visible identification using the corresponding bounding box size and the corresponding position, and inserting the one or more regions of visible identification into the user interface definition.

19. The method of claim 15, wherein the markup attributes corresponding to the user interface elements include at least one of <b>, <strong>, <i>, <em>, <u>, <ins>, <mark>, <del>, <font>, color, align, text-align, and text-decoration.

20. The method of claim 15, wherein the user interface definition includes at least one of a document object model (DOM) tree, hypertext markup language (HTML), and extensible markup language (XML).

* * * * *